United States Patent [19]

Greiner et al.

[11] Patent Number: 5,646,860
[45] Date of Patent: Jul. 8, 1997

[54] METHOD AND APPARATUS TO CONSTRUCT BUILDING COMPONENTS

[75] Inventors: Wally H. Greiner, Waterdown; Harold Ujc, Toronto; Frank Lacrosse, 22 Silver Court, Waterdown Ontario, all of Canada

[73] Assignee: Frank Lacrosse, Waterdown, Canada

[21] Appl. No.: 435,457

[22] Filed: May 5, 1995

Related U.S. Application Data

[63] Continuation-in-part of Ser. No. 372,322, Jan. 13, 1995.
[51] Int. Cl.$^6$ ..................................................... G06F 19/00
[52] U.S. Cl. ..................... 364/468.24; 364/468.21; 29/430; 227/152
[58] Field of Search ................... 364/468, 474.09, 364/505, 512, 468.01, 468.21, 468.24, 472.01, 478.01, 478.07; 29/430, 432, 795, 33 K, 897–897.32, 566, 703, 716, 798, 822, 823; 227/152, 100, 101, 111, 415, 7, 2; 269/910

[56] References Cited

U.S. PATENT DOCUMENTS

| 4,305,538 | 12/1981 | Schultz | 227/2 |
| 4,459,735 | 7/1984 | Sawdon . | |
| 4,876,787 | 10/1989 | Ditty et al. | 29/430 |

FOREIGN PATENT DOCUMENTS

| 1579193 | 8/1969 | France . |
| 2005181 | 4/1979 | United Kingdom . |
| 84/02677 | 7/1984 | WIPO . |
| 94/11597 | 5/1994 | WIPO . |

*Primary Examiner*—Paul P. Gordon
*Assistant Examiner*—Steven R. Garland
*Attorney, Agent, or Firm*—Griffin, Butler Whisenhunt & Kurtossy

[57] ABSTRACT

A table is provided to assist in the manufacture of building structures such as walls and the like, where the walls comprise a plurality of studs extending between top and bottom members. The table comprises a support surface for supporting the top and bottom members of the wall. The table includes grasping means to grasp the building structure and move it along the support surface. A computer-operated controller controls motors to locate the top and bottom framing members as desired along the table and to locate the top and bottom framing members at desired locations adjacent assembly stations. The assembly stations are used to attach a stud to each of the top and bottom members. The assembly stations are mounted on tracks and the location of the assembly stations along the track is controlled by a servo motor under control from the controller. The assembly stations may move transverse to the top and bottom framing members. The assembly stations are also movable in a vertical plane so as to be movable below the support plane of the table and to be movable to a plane to form connections. The assembly stations are also pivotable about a vertical axis.

11 Claims, 16 Drawing Sheets

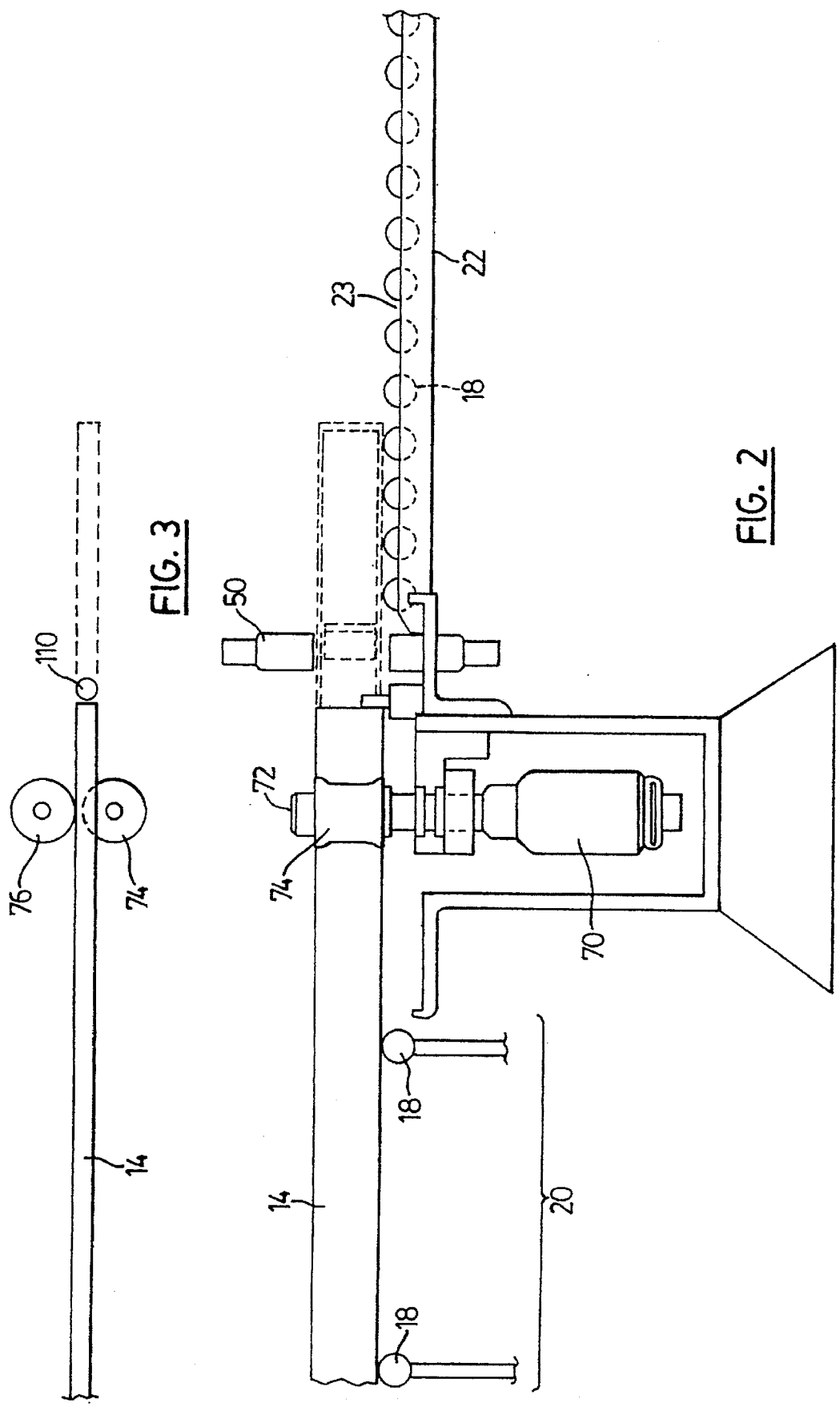

METHOD AND APPARATUS TO CONSTRUCT BUILDING COMPONENTS

This is a continuation-in-part of application No. filed on Jan. 13, 1995 and bearing Ser. No. 08/372,322. This invention relates to the field of devices to assist in the construction of building components, more particularly walls and the like. The device has application in the construction of components for use in residential, commercial and industrial buildings.

BACKGROUND OF THE INVENTION

Typically, walls have been flamed using the so-called stick flaming method. In the stick frame method walls are manufactured from studs and bottom and top framing members called plates. The studs are typically made from lumber and are usually made out of nominal two inch thickness lumber. Typically, the studs and plates may be made from lumber referred to as a two-by-four. A two-by-four is a piece of lumber of desired length having nominal dimensions of two inch thickness by four inch width. Stick flaming typically involves the technique of nailing the studs to the top and bottom plates. The convention has developed that the studs are placed along the plate spaced 16" on centers.

The wall manufactured from two-by-four building materials is relatively strong. That wall will normally support most of the structural loads which may be imposed in residential construction and often will be strong enough to support the loads required in industrial and commercial buildings as well. However, where the studs are used on outside walls and where a need for extra insulation occurs, then the width of the studs may be increased to nominal 6" boards, or in extreme cases, to nominal 8" boards. The extra width provides the necessary space to increase the insulation that is packed into the walls between the studs.

When the walls are used in the internal walls of the building and have no need for insulation then width of the material may be varied depending upon whether the wall is a structural wall, that is to say, supporting a load, or whether the wall is merely a divider wall to divide up the enclosed spaces. For ease of construction, typically most interior walls have also been manufactured from two-by-four nominally dimensioned lumber.

Construction lumber is becoming more and more scarce and accordingly is becoming more and more expensive. Additionally, working with lumber involves certain difficulties. Unless the lumber is properly dried then the two-by studs will warp or twist over time as the studs dry in the building. This can often cause changes to the wall which in turn will lead to cracking of the materials used to cover the wall which typically may be wall board and the like. As construction lumber has become more and more expensive, alternatives have been developed to the use of wooden structural members.

One of the alternatives that has developed is the use of steel studs. Steel studs can be made in roll forming machines from strips of steel of convenient gauge or thickness. The roll forming machine can roll the strip steel into a stud of any configuration. When steel studs are used, typically they are used together with upper and lower tracks into which the steel studs are intended to be placed.

Steel studs have several advantages over wooden studs. Steel studs are lighter than wooden studs for equal strength. Steel studs, of course, have no tendency to warp and thus a wall when manufactured from steel studs will not be subject to warping as the material dries and thus provides a more secure surface against which the wall surfacing materials may be affixed. Although steel studs are now well-known, there have been certain difficulties in working with steel studs.

One of the difficulties is the positioning of the stud in the upper and lower track. Another is the proper fixation of the stud into the track. Because of the convention which has become accepted for spacing for wooden studs, steel studs are similarly placed 16" on centres. This is not so much a strength requirement as it is a convention requirement so that the steel studs can be used without difficult with common building materials such as wall board which typically comes in sheet form of four foot width. The four foot width allows the sheet to be affixed to the studs at either edge and at two strips equally spaced from the edges. Where however the facing material is sufficiently strong, the studs may be placed further apart such as 24" on centres which still facilities use with four foot wide sheet facing materials while providing adequate strength. Generally stud spacing such as 16 or 24" on centres is dictated by applicable building codes.

Because steel studs are manufactured in a roll forming machine the steel studs can be made to any configuration or any dimension as desired by the building designer. Accordingly, if steel studs are to be used in an exterior wall where significant levels of insulation are required, then the studs may be manufactured of sufficient width to approximate the same dimension as a two-by-six wooden stud or even a two-by-eight wooden stud where super insulation is required.

With the known construction using two-by-four studs the process for manufacturing a wall from such building materials requires the use of skilled framing carpenters. The framing carpenters have the job of cutting the studs to the correct length. The correct length is determined by the height of the wall which typically may be of the order of 8 feet but may also be higher particularly in commercial and industrial buildings. When a number of studs have been cut to length, the carpenter must then lay out the location of where the studs will be attached to the upper and lower plates. The lay out of the studs involves the considerations of the strength of the wall as well as the other features of the wall. Where there are no other features of the wall the studs will be placed according to convention spaced 16" on centres. Where, however, the wall contains doors, windows, other openings or requires structure to facilitate the joining of intersections of meeting walls then studs must be placed where required. Typically when a window is framed a basic 16" on centre spacing will be maintained but various shorter studs some times referred to as cripple studs or other studs some times referred to as jack studs must be placed to ensure that the location of the window or door does not effect the overall strength of the wall. Even where the wall is an interior non-load bearing wall the studs must still be placed to ensure integrity of the wall when accommodating interior doors, intersecting walls and the like. All of this requires that the framing carpenter be capable of reading the architectural or structural plans for the wall and then laying out the stud spacing on the top and bottom plates. The framing carpenter then nails the studs to the plates and must ensure that the wall so manufactured is square and of the correct height and length.

The time to prepare and install the structural flaming in a house whether residential, commercial or industrial is a significant portion of the building time and is a significant cost factor in terms of both time and materials.

With the use of steel studs the same basic requirements must be met. The upper and lower tracks or channels must be laid out and the framer must now have reference to the plans and lay out the location of the studs on the top and bottom channels. When steel studs are fixed in their location in channels, most often screws are used. The screws will pass through the flange of the stud and the flange of the track. Typically the channels are laid out on a floor and studs positioned as required. As each stud is correctly positioned, a screw is driven through the channel and through one flange of the stud. A second screw in each stud cannot be installed as the wall is on the floor. When all studs are fastened with one screw, the wall can be flipped over and the second screw installed to complete each stud-channel connection. Often, in practice, the second screws are not applied if applied at all, until the wall has been positioned upright in place. This then requires the framer to climb up and down ladders to complete both top and bottom connections.

Another of the problems that has occurred in the use of metal studs and metal tracks is the problem of fully seating the stud in the track. If the track is not properly shaped then the stud may not be fully seated in the track. This is something that may not be immediately apparent to the framer. When the framer attaches a stud in place that is not fully seated in the track, the framer may not be aware of the fact that the misseating error has occurred. This unfortunately means that when a load is applied to the wall then the screw or screws fixing the stud location become structural members and in fact support the load carried on the stud. Where a metal frame wall is intended to be load bearing, the intention is that the load be communicated directly from the upper track to the stud and then to the lower track. If the stud is not properly seated in for example the upper track, then the load passes from the upper track to the screw, from the screw to the stud and creates a point of possible failure. Because of this problem, steel studs have most commonly been used in non-load bearing walls even though steel studs are stronger than wooden studs.

Typically today framing of wooden studs and headers can be done by means of a pneumatic driven nail gun. This has speeded up the nailing component of the time involved. Similarly, the installation of screws in steel studs is most often done by a powered screw gun which may be either air or electrically driven. There is however still considerable time involved in the layout and installation of the fasteners which locate the studs in the track.

BRIEF SUMMARY OF THE INVENTION

In accordance with the present invention there is provided a table which facilitates the creation of building structures such as walls consisting of studs and extending between first and second framing members or channels. The table comprises a support surface for movably supporting the first and second framing members to permit the members to be moved back and forth along the support surface. Locating means are provided on the table to locate the upper and lower framing members and to define a start position. The table comprises grasping means to grip the building structure to move the building structure back and forth along the table as required and motor means to move the building structure. The table also includes controller means to control the motor means to translate the building structure predetermined distances along the support structure. The table further comprises locating means to locate a stud between the framing members and at least first and second assembly stations. The assembly stations are adapted to affix a stud to the first and second framing members respectively. The control means is adapted to receive information determining the location of the studs in the building structure with respect to the first and second framing members.

In accordance with the present invention a method of forming a building structure having first and second framing members and a plurality of studs extending between the framing member comprises the steps of locating a first framing member on a support surface, locating a second framing member on the support surface with the second framing member spaced from the first framing member and arranged parallel thereto, grasping the building structure and locating the building structure in a first position, assembling a stud to extend between the first and second framing members and locating the stud adjacent first and second assembly means, moving the first and second flaming members to desired positions, connecting the stud to the framing members, advancing the building structure along the support surface, assembling a second stud to extend between the first and second flaming members and locating the second stud adjacent the first and second assembly means, controlling the position of the building structure and locating the building structure with respect to the second stud in a predetermined location and then connecting said second stud to said building structure.

BRIEF DESCRIPTION OF THE DRAWINGS

The invention will be further understood by reference to the attached figures which illustrate a preferred embodiment of the invention and in which.

FIG. 2 is a side view of a portion of the device of FIG. 1 illustrating a frame member supported on a support surface;

FIG. 3 is a plan view of the structure of FIG. 2, but showing only the frame member and the mechanism to grasp the frame member;

DESCRIPTION OF PREFERRED EMBODIMENTS

Figure 1:
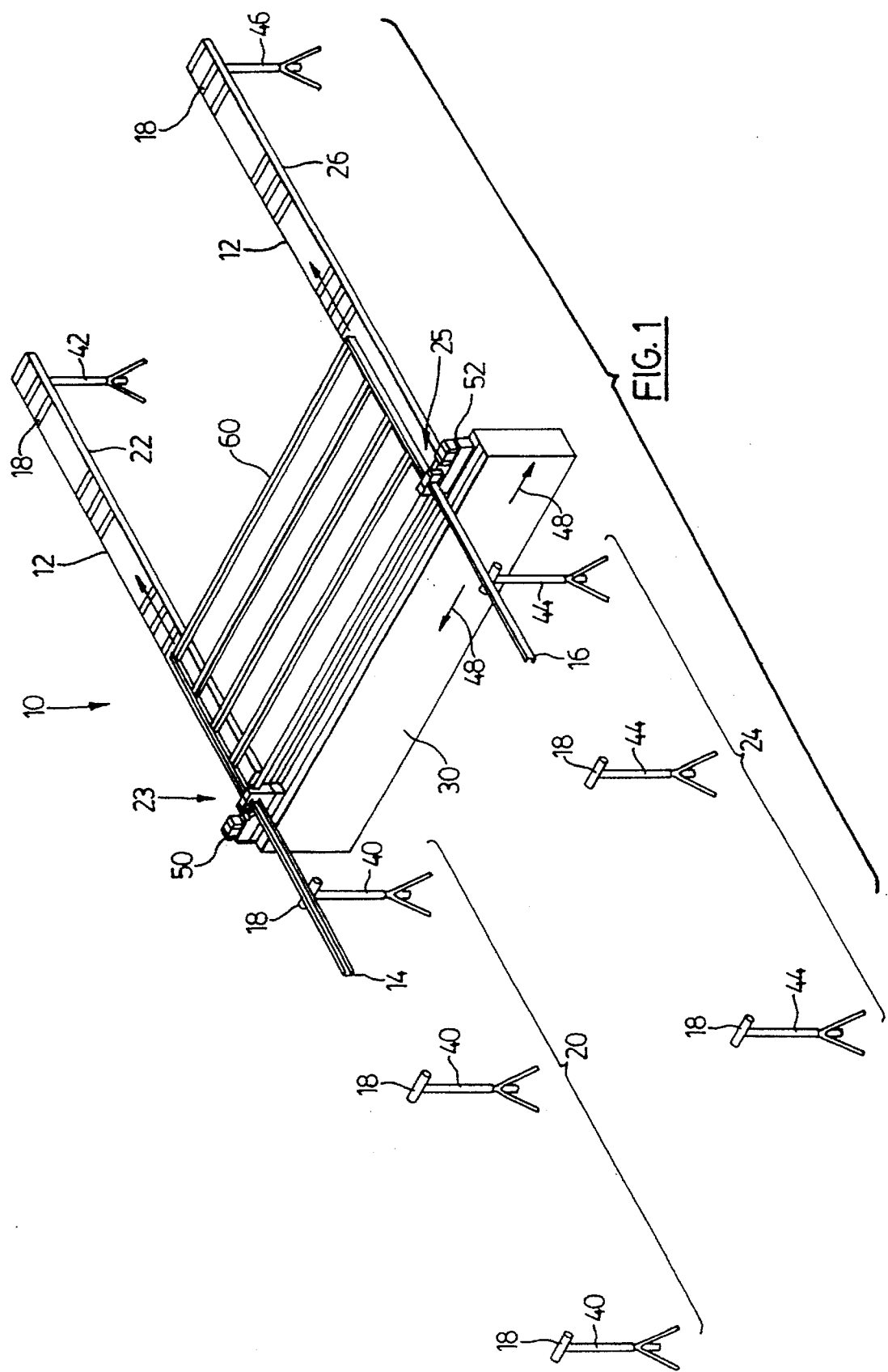
FIG. 1 is a plan view of a table in accordance with the invention.

FIG. 1 illustrates the table of a preferred embodiment in accordance with the invention. The table shown generally as 10 includes a support surface 12. The support surface 12 is adapted to support an upper track 14 and a lower track 16. The upper and lower tracks 14 and 16 are the horizontal components of the finished wall. Each of the upper and lower tracks are manufactured from suitable gauge sheet steel and have an essentially U-shaped configuration with square corners. The track is sized to closely receive studs of the desired configuration.

The surface 12 of the table 10 is defined in the preferred embodiment by a series of rollers 18. The rollers 18 are journalled in bearings and permit the upper and lower tracks 14 and 16 respectively to roll freely back and forth along the table 10.

The table 10 is sufficiently wide to manufacture the wall of desired height. Where a table is to be used exclusively to manufacture walls of nominal eight foot height then the support surface is desirably slightly larger than eight feet. If higher ceiling walls are desired such as is typical in industrial and commercial walls a wider table would be provided.

The table shown in FIG. 1 is a particularly advantageous embodiment of the invention and is a knock-down table that can be readily disassembled, moved to a construction site and assembled on site. In other cases of course, construction tables may be used in plant facilities and the finished walls then trucked to the building site as desired.

With reference to FIG. 1 it will be observed that the table 10 comprises four sub-components each of which is a roller conveyor section. Sections 20 and 22 forming array 23 support the top channel 14 while sections 24 and 26 forming array 25 support the lower channel 16 of the wall to be manufactured. A structural beam 30 extends between the two roller arrays 23 and 25 thus formed. The roller sections may be supported on folding legs 40, 42, 44 and 46. The other end of the four sections is supported on the central beam member 30. The conveyor array 25 may be horizontally slidable on the beam member 30 to facilitate the manufacture of walls of different heights. Thus, where a wall of nominal height 8 feet was required the sections 24 and 26 could be mounted to the beam 30 with the spacing of 8 feet between the array 23 and the array 25. Where a wall of greater ceiling height is desired the sections 24 and 26 can be slid outwardly on the beam 30 to accomplish the manufacture of a wall that might be 9½ feet tall, 10 feet tall, 12 feet tall or as desired (see arrows 48). For the greatest flexibility the beam must be longer than the greatest wall height desired to be built on the table.

With the construction as shown in FIG. 1 the beam 30 becomes a central point for location of the other major components of the table.

Assembly stations 50 and 52 may be conveniently located along the beam where the beam meets the support sections 23 and 25. One assembly station 50 is used to affix the stud to the top track while the other assembly station 50 is used to affix the stud 60 to the lower track 16.

Figure 4:
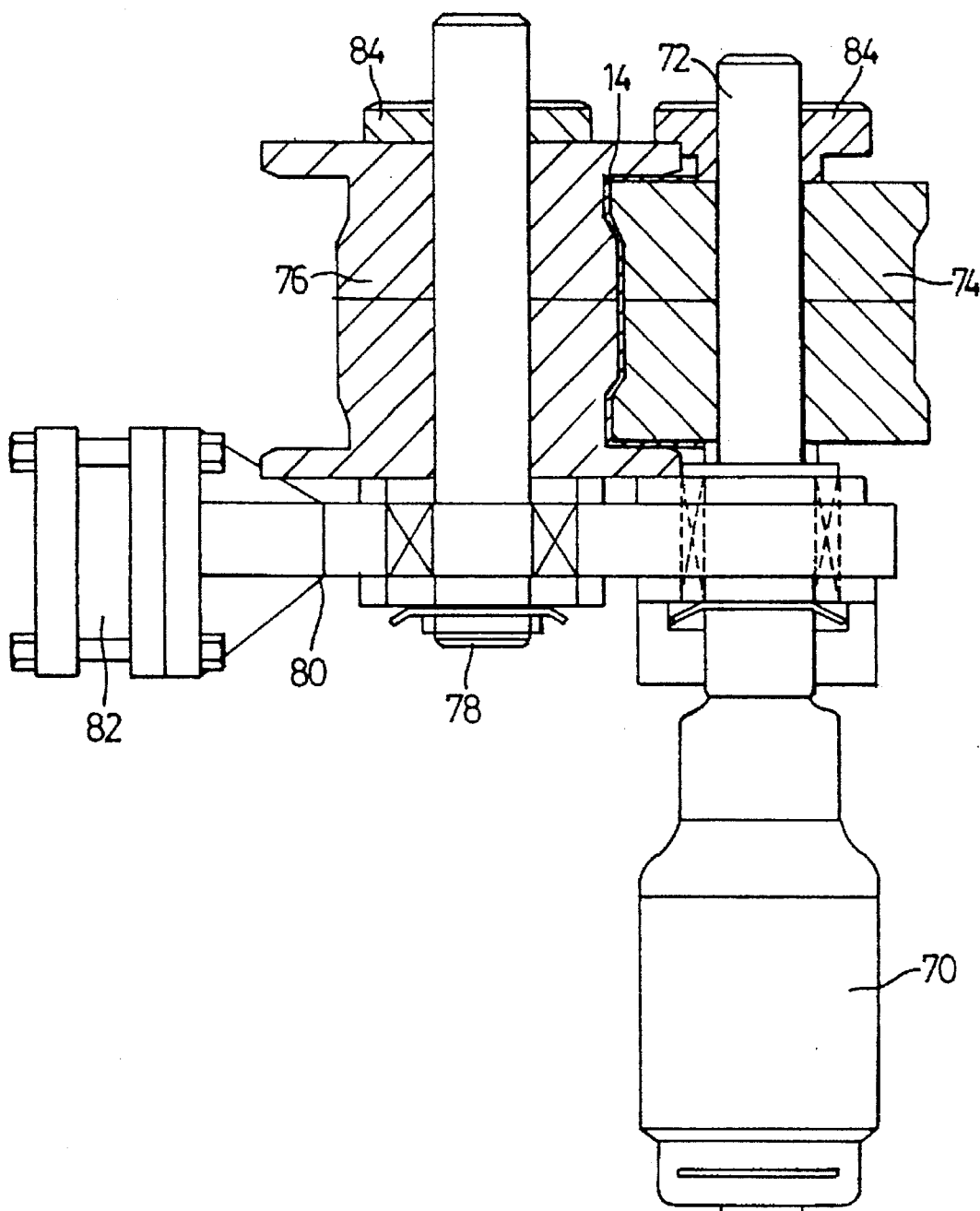
FIG. 4 is a sectional detail of the structure in FIG. 2 illustrating the mechanism for grasping the frame member illustrated in FIG. 2.

The table in accordance with the invention also includes means to move the upper and lower tracks back and forth along the roller support surface. A convenient means of driving the tracks back and forth is shown in FIGS. 2, 3 and 4. As shown in FIGS. 2 and 4 the drive means includes a servo motor 70 which extends vertically. The drive shaft 72 of the drive motor 70 extends upwardly above the support surface. A roller 74 is keyed on the drive shaft and revolves with the drive shaft under the effect of the motor 70. A second roller 76 is located horizontally opposite the first powered roller 74. The second roller 76 is located on an axle 78. The axle 78 is located in a bracket 80. The bracket 80 is in turn supported by a cylinder 82 which may be air powered.

As shown more clearly in FIG. 4, the two rollers 74 and 76 have co-operating surfaces which together grasp the profile of the track or channel 14. When a channel 14 is placed in position, the cylinder 82 is operated to bring the roller 76 into contact with one surface of the channel 14 and to force the channel against the powered roller 74. The roller 76 is an idler roller and is free to turn on its shaft 78. Thus, when the motor 70 revolves it will turn the drive shaft 72 and through a key will revolve the powered roller 74. Because the idler roller 76 is forced against the channel 14 there is significant friction between the rollers and the channel so that the powered roller accurately moves the channel back and forth along the support surface 12.

The rollers 74 and 76 are split rollers which may be readily removed from the powered and idler shafts 72 and 78 respectively. Where the channel 14 is of a nominal four inch width to take studs which may be nominally 4" wide then rollers adapted for channel of that size and configuration may be used. If for any reason it is desired to make use of studs that may be wider such as 6 or 8 inches, then rollers having a profile to match appropriate size channel can be installed on the shafts. In each case the shaft includes a threaded end and a lock nut 84 so that rollers may be readily removed and replaced if required to accommodate different size channel.

A similar drive mechanism is used on each side of the table so that the upper and lower channel 14 and 16 are both driven so the upper and lower channels 14 and 16 may be moved back and forth along the conveyor arrays 23 and 25. Ideally the two motors are connected together in a slave relationship so that the upper and lower channels 14 and 16 are moved at precisely the same time and precisely the same distance.

Figure 5:
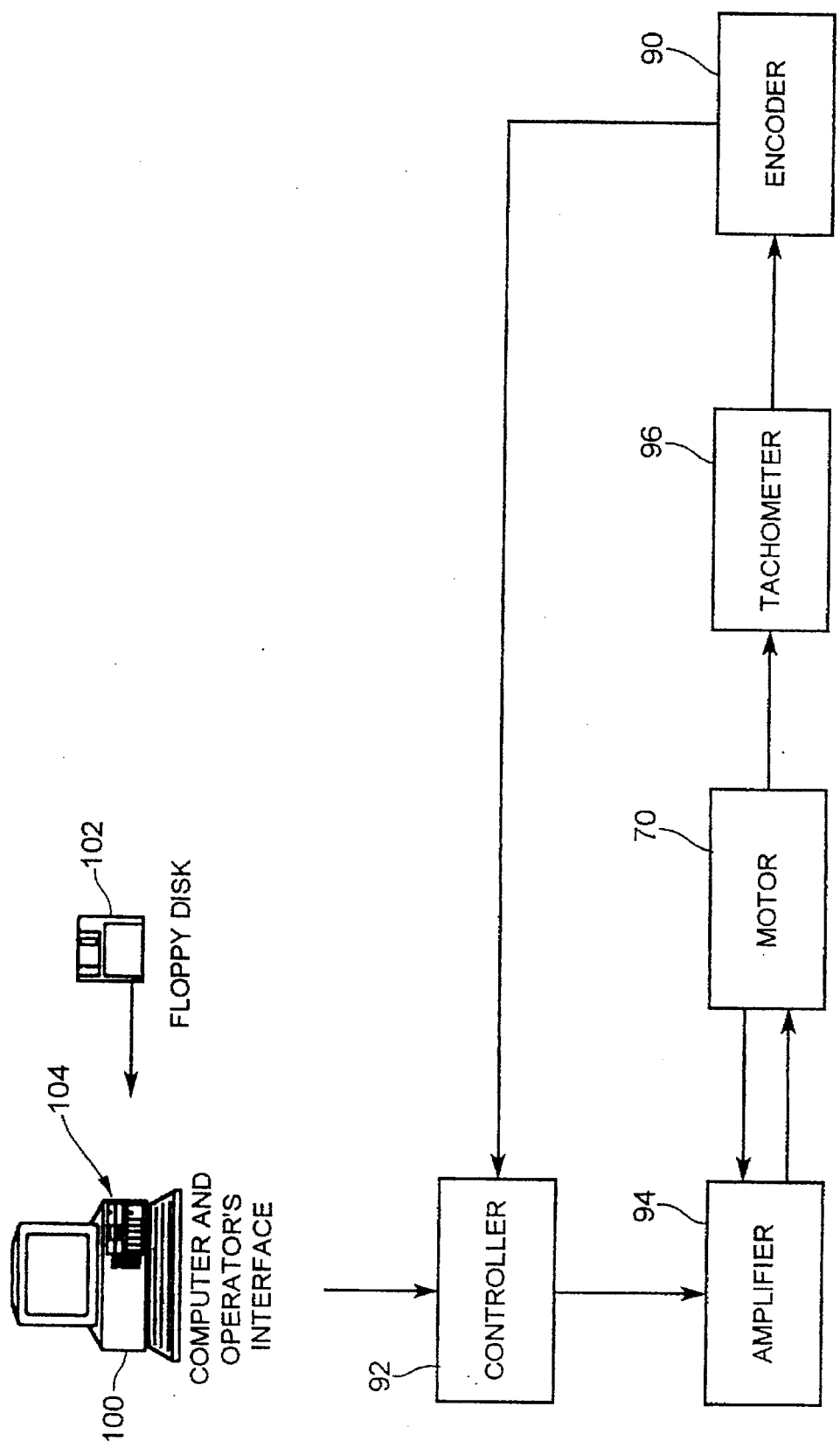
FIG. 5 is a block diagram showing the computer control of the device of FIG. 1.

The control circuit for the motor 70 is shown in schematic diagram in FIG. 5. The control system is an open loop concept in which an encoder 90 is located in back of motor 70. The encoder sends signals back to a controller 92 providing motor position information. A separate encoder (not shown) applied to the upper or lower channel 14 and 16 could be used to feedback information to ensure that exact channel position has been obtained. However, because there is virtually no slippage between the rollers and the channel with the structure shown in FIGS. 2, 3 and 4, it is found that this has not been required in practise.

A principal feature of the invention is the controller 92. The controller 92 develops a signal which is passed to an amplifier 94. The output of the amplifier is used to drive the servo motor 70.

A tachometer 96 attached to the motor sends back a velocity signal to the amplifier 94. An encoder 90 behind the tachometer sends both velocity and position information to the controller 92. The controller 92 receives its input from a computer and interface 100. One of the principal features of the invention is that the computer 100 which directs the controller 92 is loaded with information as to the wall to be built. The computer 100 thus contains in computer readable format, information concerning the location of all of the required studs 60 for the wall to be built. Preferably the information is contained on a disk 102 or other type of media easily readable by a computer. Most preferably the computer may have a port so that information from a computer assisted design (CAD) device could be downloaded directly into the computer. This eliminates the need for drawings for use in manufacturing the wall.

In order to manufacture a wall with this system it is important that the upper and lower channels 14 and 16 be accurately positioned to start the manufacturing process. In order to aid in the assistance of the initial phase of the manufacturing the table 10 is fitted with a pair of disappearing dogs 110 and 112, shown in FIGS. 3 and 6. In order to commence the manufacturing operation, an operator selects an appropriate upper 14 and lower 16 channel. The upper and lower channels 14 and 16 are placed on support surface portions 20 and 24 in substantially parallel alignment and rolled toward the assembly stations 50 and 52. The disappearing dog is located on the other side of the assembly stations 50 and 52 so that the upper and lower channels 14 and 16 respectively pass by the assembly stations 50 and 52 and encounter the disappearing dogs 110 and 112. When the upper channel 14 and lower channel 16 respectively encounter the disappearing dogs 110 and 112 and are located against the dogs, then the operator selects a first button on the control panel 92 to indicate that the upper and lower channels 14 and 16 are in position against the dogs 110 and 112. On receiving the signal from the operator, the controller 92 then causes the cylinders 82 to cause the idler rollers 76 to move inwardly toward the channels so that the upper and lower channels are grasped firmly against the power rollers 74. If desired the power rollers 74 could then cycle to ensure that each channel 14 and 16 is located firmly against the dogs 110 and 112. This creates a "home" position from which the controller 92 may thereafter control the position of the channel 14 and 16. With the channel 14 and 16 firmly grasped between power roller 74 and idler roller 76 the dog 110 and 112 is then retracted below the surface 12 of the table so that the channel 14 and 16 may then be moved along the table as required by the controller 92.

Figure 6:
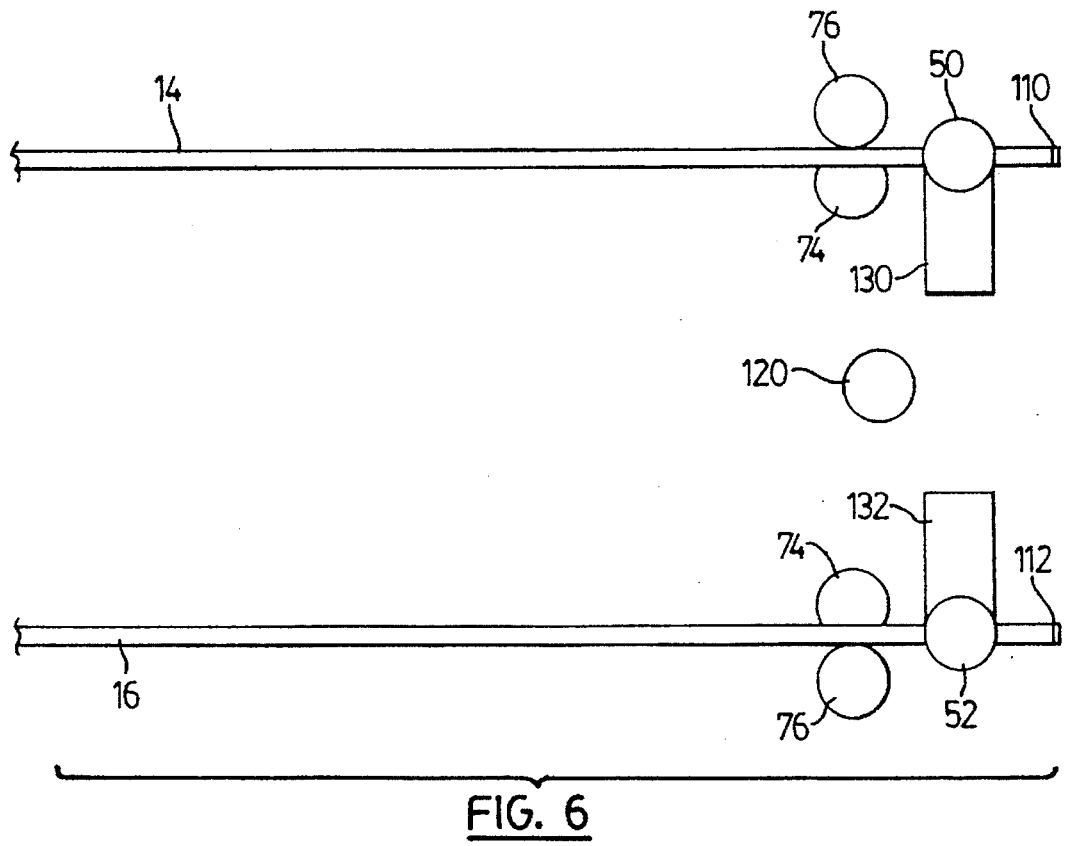
FIG. 6 is a plan view showing the location of two flaming members on the support surface of the device of FIG. 1 which show the initial start position for the process.
Figure 7:
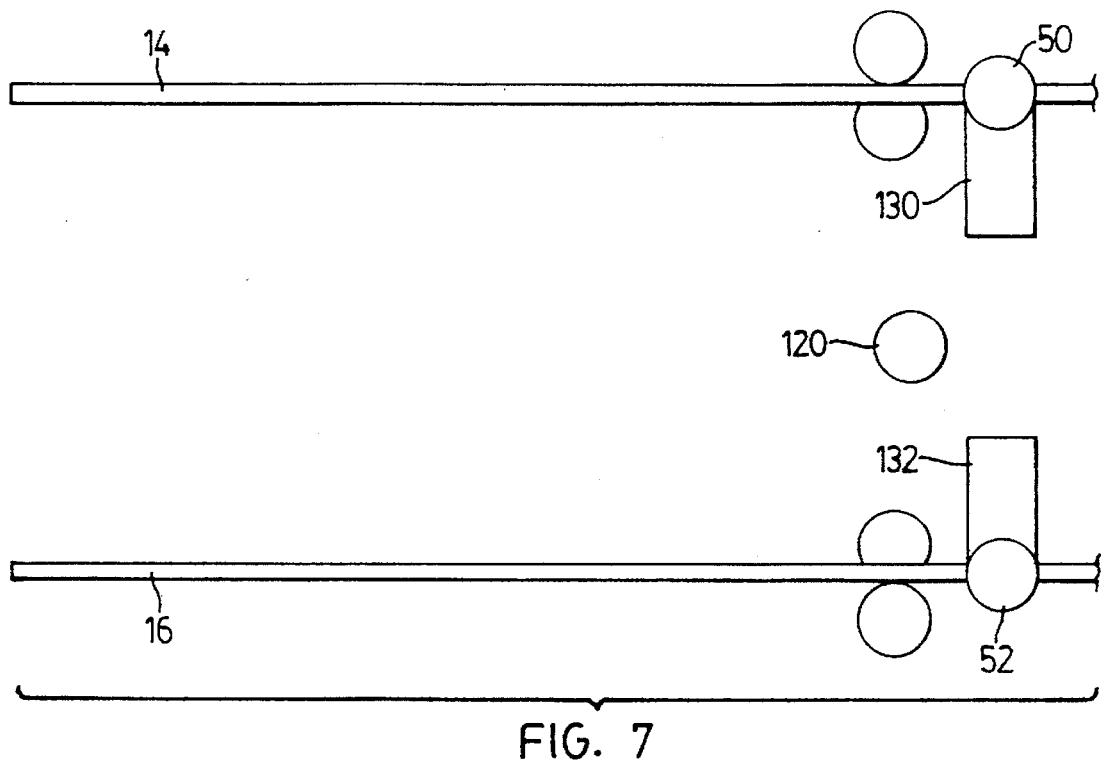
FIG. 7 is a view similar to FIG. 6 but showing another step in the process.
Figure 8:
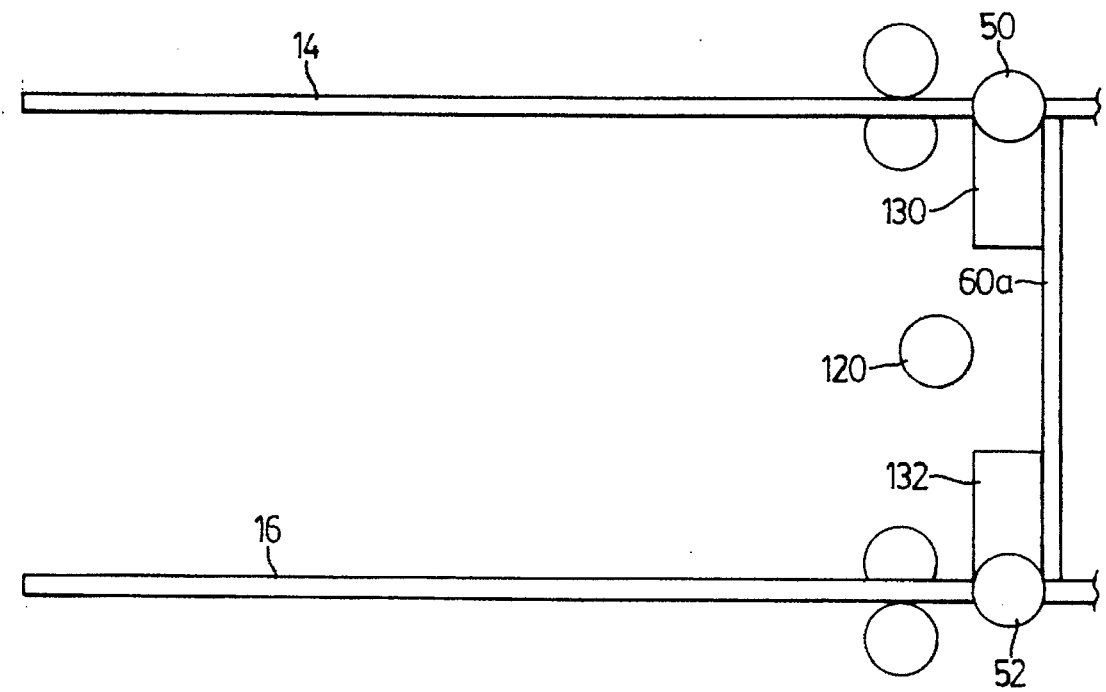
FIG. 8 is a view similar to FIG. 7 but showing another step in the process.
Figure 9:
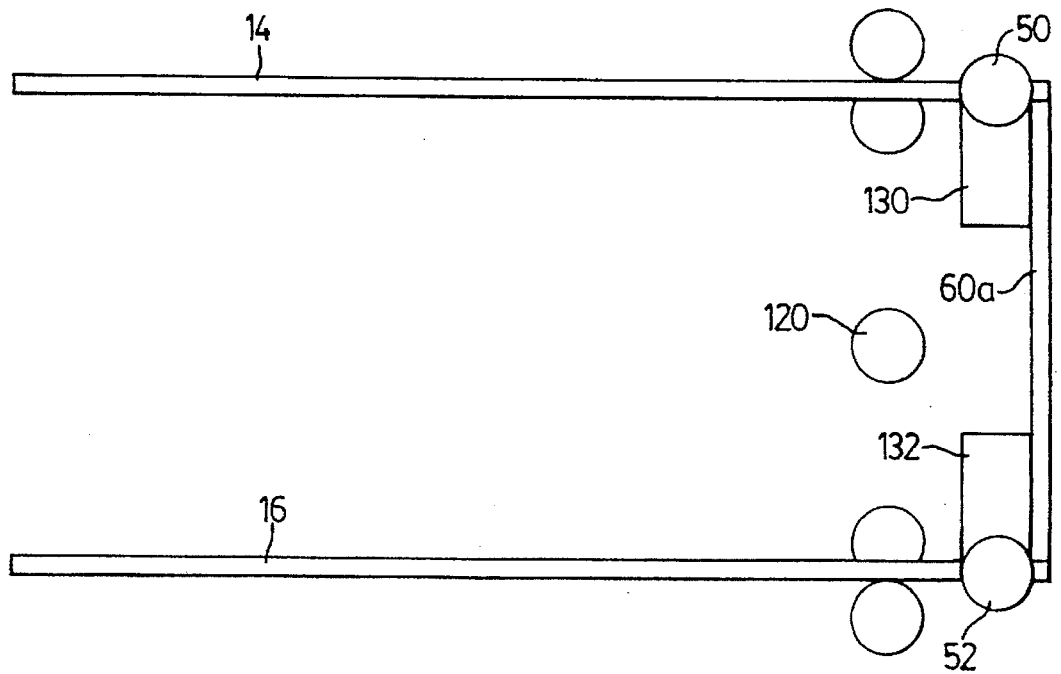
FIG. 9 is a view similar to FIG. 8 but showing another step in the process.
Figure 10:
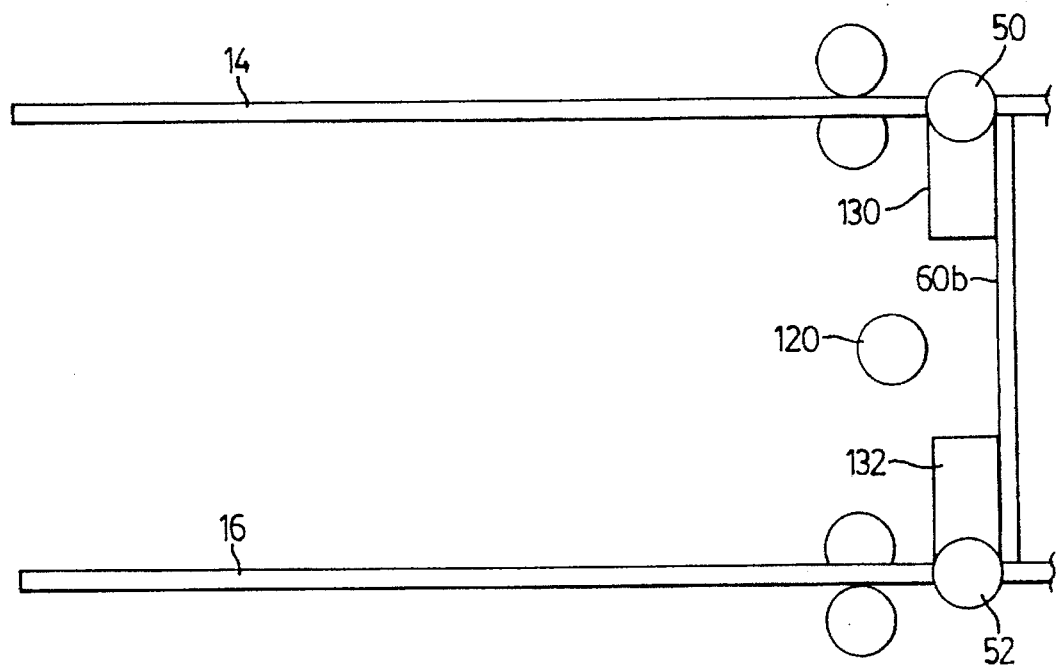
FIG. 10 is a view similar to FIG. 9 but showing another step in the process.

Located adjacent the assembly stations 50, 52 are installation jigs adapted to receive the stud 60. The initial configuration for the start of manufacturing is shown in FIG. 6. The operator who is to build the wall stands approximately as shown in FIGS. 6 through 13 at position 120. FIG. 6 shows the upper 14 and lower 16 channels in place in the "home" position as established by the disappearing dogs 110, 112. When the operator pushes the first button on the control panel 92, the upper and lower tracks are moved to the right as shown in FIG. 7. The channels 14, 16 roll freely along the conveyor arrays 23 and 25. The operator then selects a stud 60a and manually positions the stud between the upper 14 and lower 16 channel. Because the upper and lower channels 14, 16 are U-shaped the operator is required to position the stud 60 angularly between the tracks 14, 16 and then pull the stud 60 into position. When the stud 60 is in position between the upper and lower channels 14, 16 the operator pulls the stud 60 back towards the operator so that the stud is then received and positioned against receptor blocks 130 and 132. The open edge of the stud 60 faces the operator 120. Once a stud 60 is positioned against the receptor blocks 130, 132 which may include magnets to assist in holding the stud in place, the operator activates a second switch. This switch signals the controller that a stud is in place at the assembly stations 50, 52. On activation of the second switch, the controller 92 then directs the servo motors 70 to position the upper and lower channels 14, 16 appropriately. As shown in FIG. 9, the controller 92 will move the upper and lower channels 14, 16 to the left as shown in FIG. 9 so that the end of each channel 14, 16 is located precisely opposite the stud 60a. The end of each channel 14, 16 and the stud 60a are then positioned immediately adjacent the assembly stations 50 and 52. The assembly stations 50, 52 automatically perform the assembly operation affixing the stud 60a to the upper and lower channels 14, 16. Upon completion of the assembly operation the controller 92 moves the upper and lower channels 14, 16 forward (toward the right) on the support table to the position as shown in FIG. 10. It will be observed by reference to FIG. 10 that the first stud 60a which has been assembled to the upper and lower channels 14, 16 has been moved away from the assembly stations 50, 52 more than the typical spacing of the studs along the wall. At this time the operator is ready to install a second stud 60b.

Figure 11:
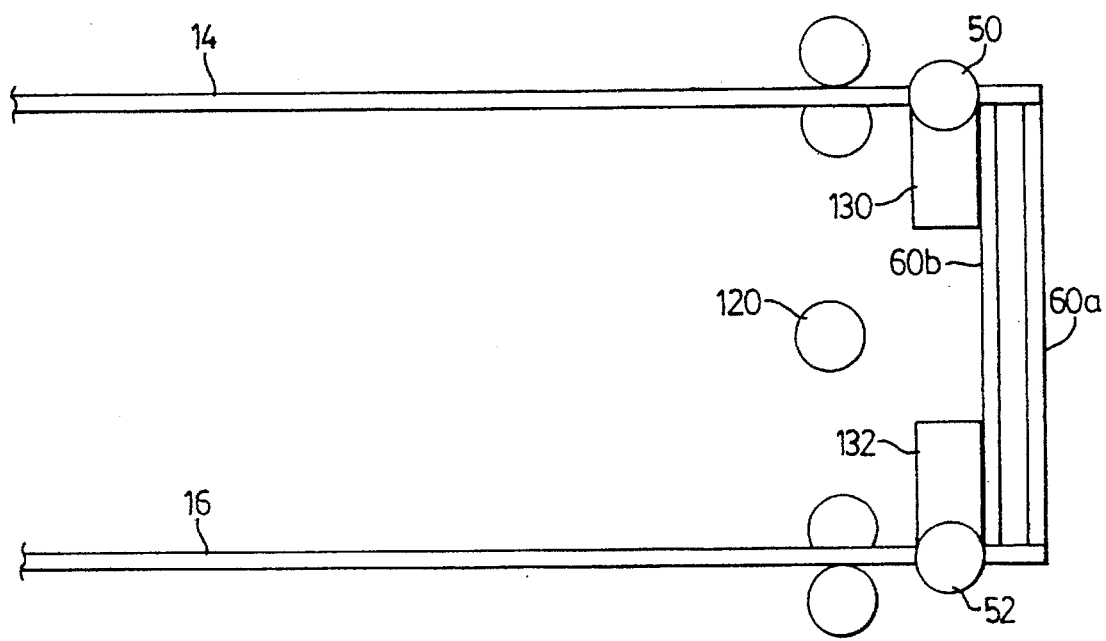
FIG. 11 is a view similar to FIG. 10 but showing another step in the process.
Figure 12:
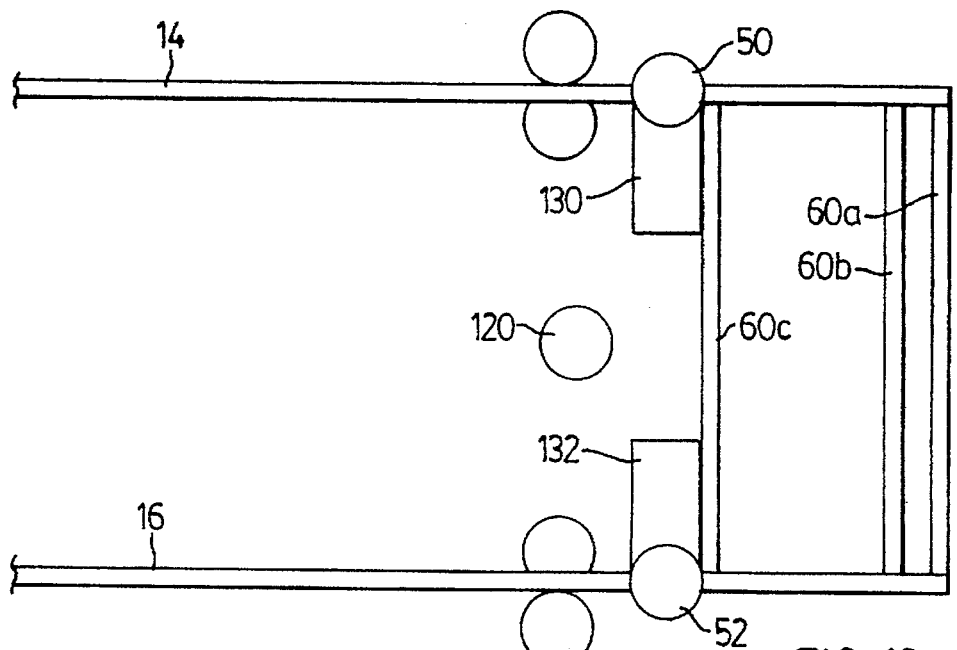
FIG. 12 is a view similar to FIG. 11 but showing another step in the process.
Figure 13:
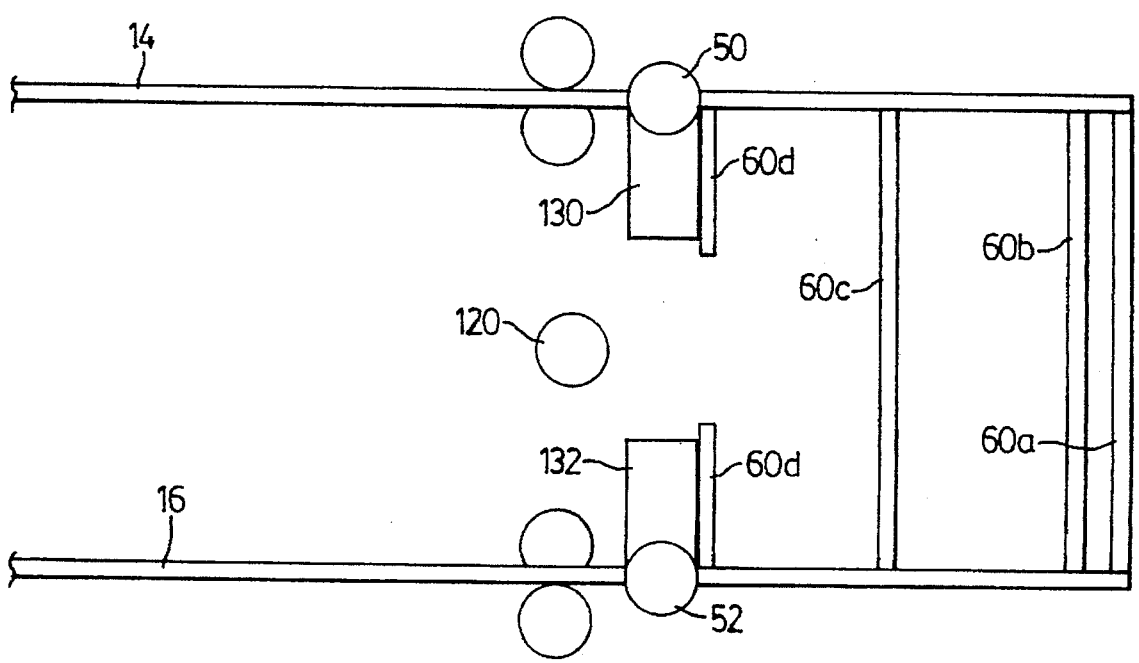
FIG. 13 is a view similar to FIG. 12 and showing another step in the process.

The operator 120 selects a second stud 60b and again positions the stud 60 between the upper and lower channels 14, 16 and against the receptor blocks 130, 132. When the operator has securely positioned the second stud 60b against the receptor block 130, 132, he again activates the second button. At this time the computer 100 reads its program to decide where the second stud 60b should be placed along the upper and lower channels 14, 16. The controller 92 receives this information and controls the servo motors 70 so that the channels 14, 16 are moved back to the left as shown in FIG. 11. When the channels 14, 16 are in the correct position the assembly devices 50, 52 automatically cycle and a second stud 60b is affixed in position. As shown in FIGS. 11 and 12 and as is typical in most walls the first two studs 60a and 60b are spaced relatively close together to assist in forming a corner.

At this time the operator selects a third stud 60c and repeats the process. In order to assist the operator in providing sufficient room to install the studs 60 in each case, the device preferably advances the wall more than the spacing required between the stud most recently installed and the stud to be installed, thus providing the operator additional room and freedom to quickly assemble the stud 60 between the upper and lower channels 14, 16. When the operator again operates the second button, the channels 14, 16 retract to the appropriate position, the assembly stations 50, 52 are cycled once again and the channels 14, 16 then advance for the installation of the next stud.

Where it is desirable to install cripple studs and the like, these may also be installed on the table 10. In these cases two short cripple studs 60d are located within the upper and lower channels 14, 16 respectively with each cripple stud 60d being placed against the receptor blocks 130, 132 appropriately. The operator then cycles the device once again, and the channels 14, 16 are properly located relative to the cripple studs 60d which are then affixed to the channels 14, 16.

The assembly of the wall then continues for whatever length of wall is required. The final or end stud may be attached to the channels 14 and 16 manually at the end of the channels. This may be done while the wall is on the support surface or later, as desired.

The assembly stations 50 and 52 are essentially similar. The particular fixation system between the channel 14, 16 and the stud 60 is a matter of choice for the designer. If the studs and channels are to be joined by screws then the assembly station will include upper and lower driven screw guns. Typically automatic screw feeds can be used to provide screws. The screws can be driven from above and below so that screws are driven through the flanges of stud 60 into the flanges of the channels 14, 16 respectively.

Figure 14:
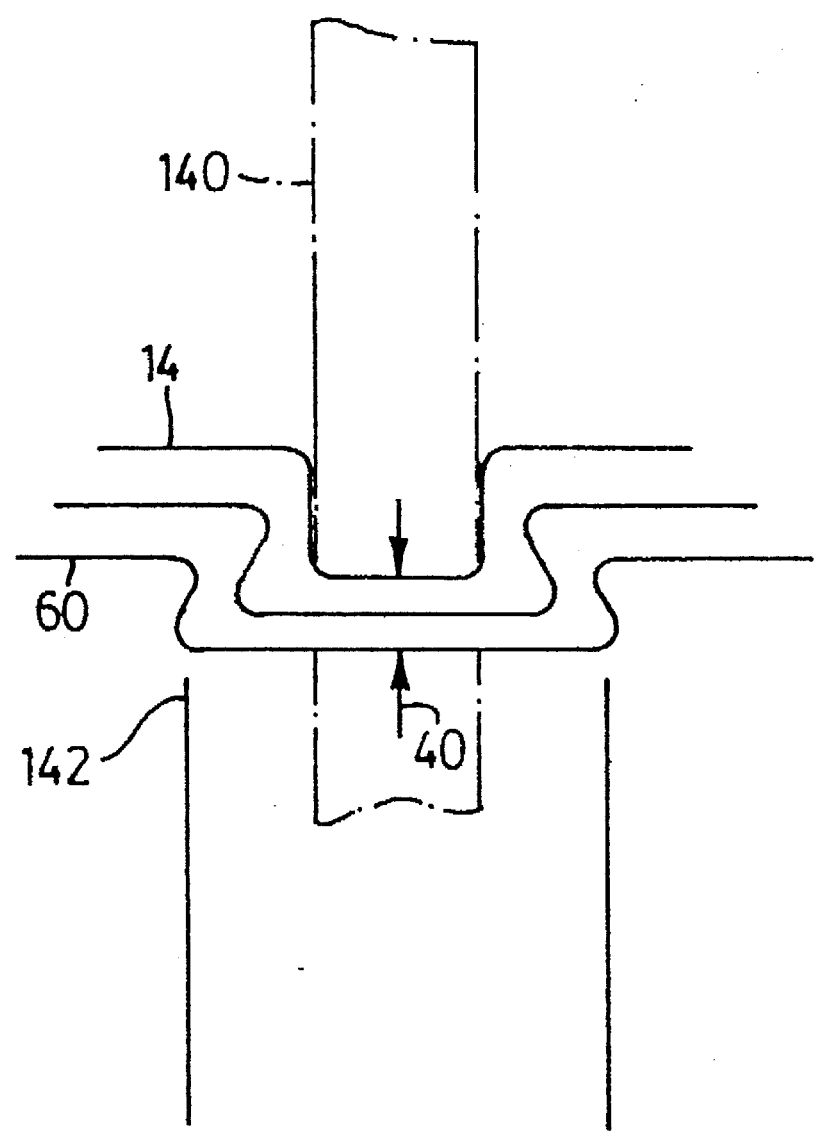
FIG. 14 is a cross-sectional view of a particularly desirable method of joining two pieces of sheet steel material together.

An alternative is to use a button type of configuration. Button joints have been used in the automotive industry in place of spot welds. In the button joint (see FIG. 14) there is required a hydraulic ram 140 which is pushed into one surface of the materials 14, 60 to be joined. The other surface of the materials 14, 60 to be joined is supported in an anvil 142. As the ram 140 pushes towards the anvil 142, a deformation of the two layers of metal is achieved forming a very strong button joint. This is more fully explained in U.S. Pat. No. 4,459,735 issued in 1984 and U.S. Pat. No. 4,757,609 issued in 1988, the disclosures of which are herein incorporated by reference. As an alternative, spot welders could also be used.

The precise number of screws, buttons or spot welds or the like for each connection is simply a matter of choice to the designer depending upon the requirements of the wall.

The combination of the receptor blocks 130, 132 and the rollers 74 and 76 can be used to overcome another of the deficiencies of the prior art. Because the idler roller 76 is moved by a hydraulic cylinder 82, it may be forced against the track 14 and against the drive roller 74 with considerable pressure. The pressure between the rolls may thus be used to perform an accurate and final resizing and reconfiguration of the channel 14 (see FIG. 4). Thus where the channel has been manufactured in a roll forming operation perhaps remote from the construction site, it is possible that the flanges of the channel may have been deformed somewhat during the shipping and loading and unloading processes. The idler and powered rolls 76 and 74 can thus serve as a final sizing step for the channel. The receptor blocks 130, 132 accurately locate and hold the studs 60 while the connection is being made. As the distance between the powered roll 74 can be set accurately to maintain the overall height of the wall, it is ensured that the studs 60 are fully seated in the top and bottom channels 14, 16 respectively. If a stud 60 is not properly seated in the channel then the operator will not be able to seat the stud 60 against the receptor blocks 130, 132. Because the channel is accurately held by the powered rollers 74, the stud 60 would then be angled slightly rather than perpendicular to each of the channels 14, 16 and this would be detected at the receptor blocks 130, 132. Thus, the receptor blocks 130, 132 ensure that the stud is located in the right position prior to the assembly operation.

While upper and lower channels 14, 16 are typically of a U-shaped configuration, studs may be of different configurations depending upon their purpose. If steel studs are to be used as a dividing wall not carrying any structural loads, the studs may also be of a straight U-shaped configuration. Typically when steel studs are to be used as a structural wall carrying vertical loads, then the studs are so-called C-shaped sections. These are essentially U-shaped studs with a short return on each flange to provide increased strength. Studs are cut to appropriate length and are joined with fasteners through the flanges. The table and method as described herein however are not limited to fixing the studs through the flanges. A unique stud is illustrated in FIGS. 15 and 16.

Figure 15:
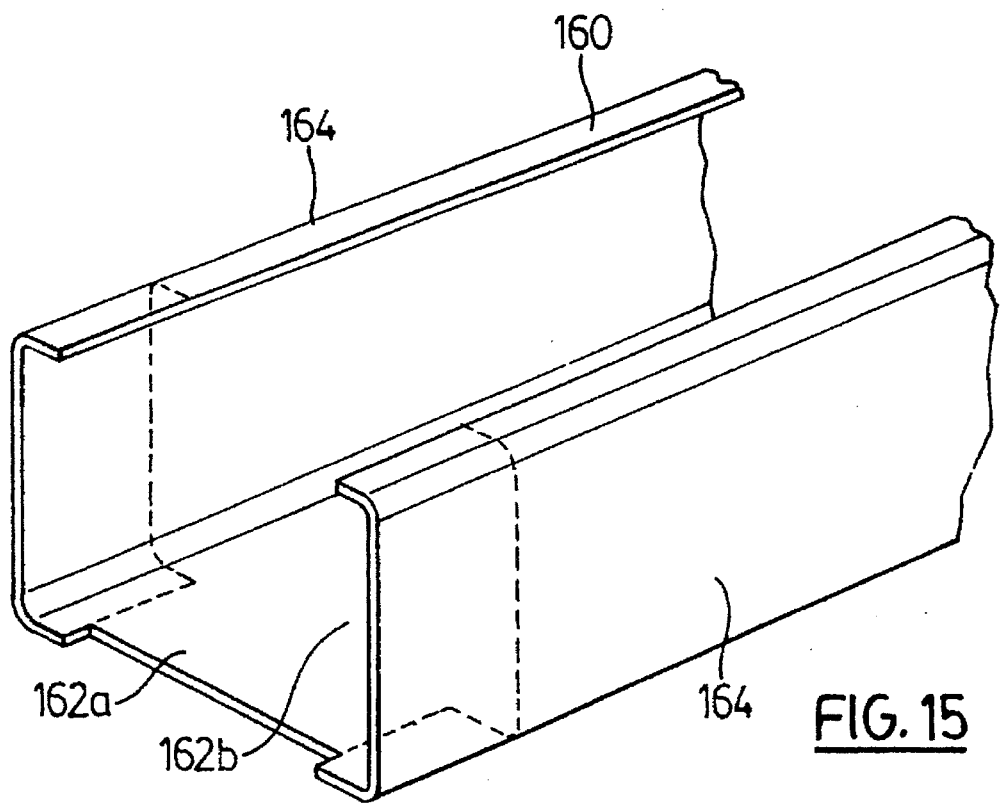
FIG. 15 is an isometric view of a stud which may be used in constructing building structures prior to modification.
Figure 16:
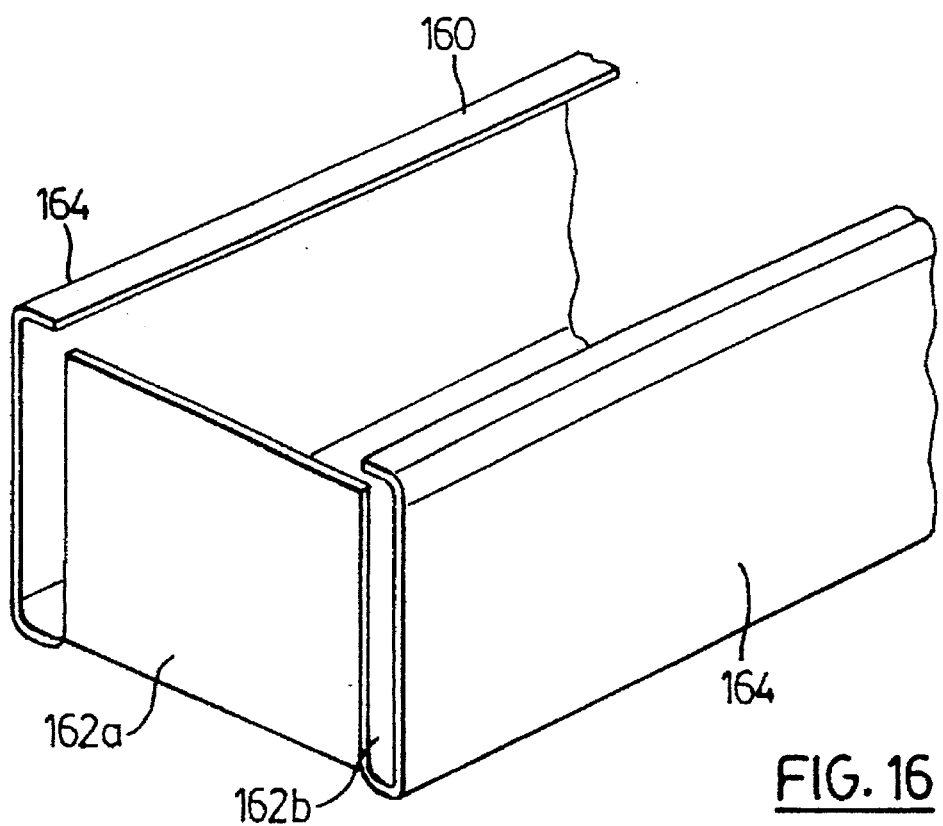
FIG. 16 is a view of the stud of FIG. 15 which has been modified.

The stud 60 shown in FIGS. 15 and 16 is of the typical C-shaped configuration. However, the stud 160 has been modified at the end so that the web 162a is bent at a 90° angle and extends at 90° to both the web 162b and the flanges 164. In order to make the stud 164 shown in FIG. 16, the stud is cut along the dotted lines shown in FIG. 15. A portion of each flange is removed leaving a tongue on the web 162a. The tongue on web 162a is bent 90°. This provides a surface of web 162a which would then parallel and lie adjacent to the web of the upper or lower channel 14, 16 as the case may be. With a stud of this configuration then the assembly station 50, 52 may be tipped 90°. Using the table of FIG. 1, the assembly station could then pass the fasteners through the flange of the channel and the bent flange of web 162a of the stud 160. Again the method of fixation could be screws, spot welds or button joints as described above, or indeed any other kind of fixation that may be used to join two metal sheets together.

The gauge of the materials that may be used for either channels or studs is also something that can be chosen by the designer. Typically the gauge of the stud will be determined by the load to be carried by the stud. Any type of stud may be utilized in the machine and process as described herein. The only change that is required is that the receptor blocks 130, 132 must be sized and configured to accept the stud being used. As indicated above, the drive and idler rollers 74, 76 must also be sized to meet the configuration and gauge of the channels 14, 16. Finally, the assembly stations 50, 52 must also be equipped with appropriate devices to match the gauge of the materials being joined. Where the preferred button joint system is used this simply means appropriate choice of anvil and punch for the gauge of metals to be joined.

The embodiment shown in FIGS. 17 through 22 provides for additional flexibility beyond the more simple device shown in FIGS. 1 through 16. The device shown in FIGS. 1 through 16 is suitable for manufacturing building structures where the upper and lower channels and studs are of relatively light gauge. Where the building structure is intended to support heavier loads, then the gauge of the studs and upper and lower channels will be increased. With thicker material it becomes more difficult to position the stud correctly between the upper and lower channels. Accordingly, it is desirable that additional means be provided to correctly position the stud within the upper and lower channels particularly when there is thicker gauge metal used.

Another area of desired flexibility is the orientation of the stud. With the device illustrated in FIGS. 1 through 16 and with use of the fixed assembly stations 50 and 52 combining with the receptor blocks 130 and 132, the stud 60 will be placed between the upper and lower channels with the studs all facing the same direction. It is desirable, particularly when flaming openings such as are required for doors and windows or for the beginning and end of the building structure to be able to oppositely orient the opening of the studs. Thus, when flaming a door, it may be that the studs should be placed so that the web of the studs face each other providing a surface against which hinges could be mounted on either side of the opening. Re-orientation of the studs in this regard may require reorientation of the assembly stations 50 and 52, particularly if those assembly stations are of the button configuration rather than simple screw guns or spot welders.

While the more simplified version shown in FIGS. 1 through 16 is adequate to build a building structure such as a wall there may be portions of building structure that cannot be reached by the assembly stations 50 and 52. While the earlier device is adequate for placing cripple studs and the like at the joint with the upper and lower flaming members, in view of the fact that the assembly stations 50 and 52 are not horizontally movable there is no ability to use those assembly stations to affix the other end of the cripple studs to headers that may be useful in framing door, window openings and the like. Thus, it would be desirable to have moving assembly stations which could be used to make connections that are intermediate the upper and lower channels 14 and 16.

The device 210 shown in FIGS. 17 through 21 is controlled by a computer 100 in a fashion similar to that discussed in association with the device discussed above. The device in FIG. 17 through 21 however provides addition flexibility.

Figure 17:
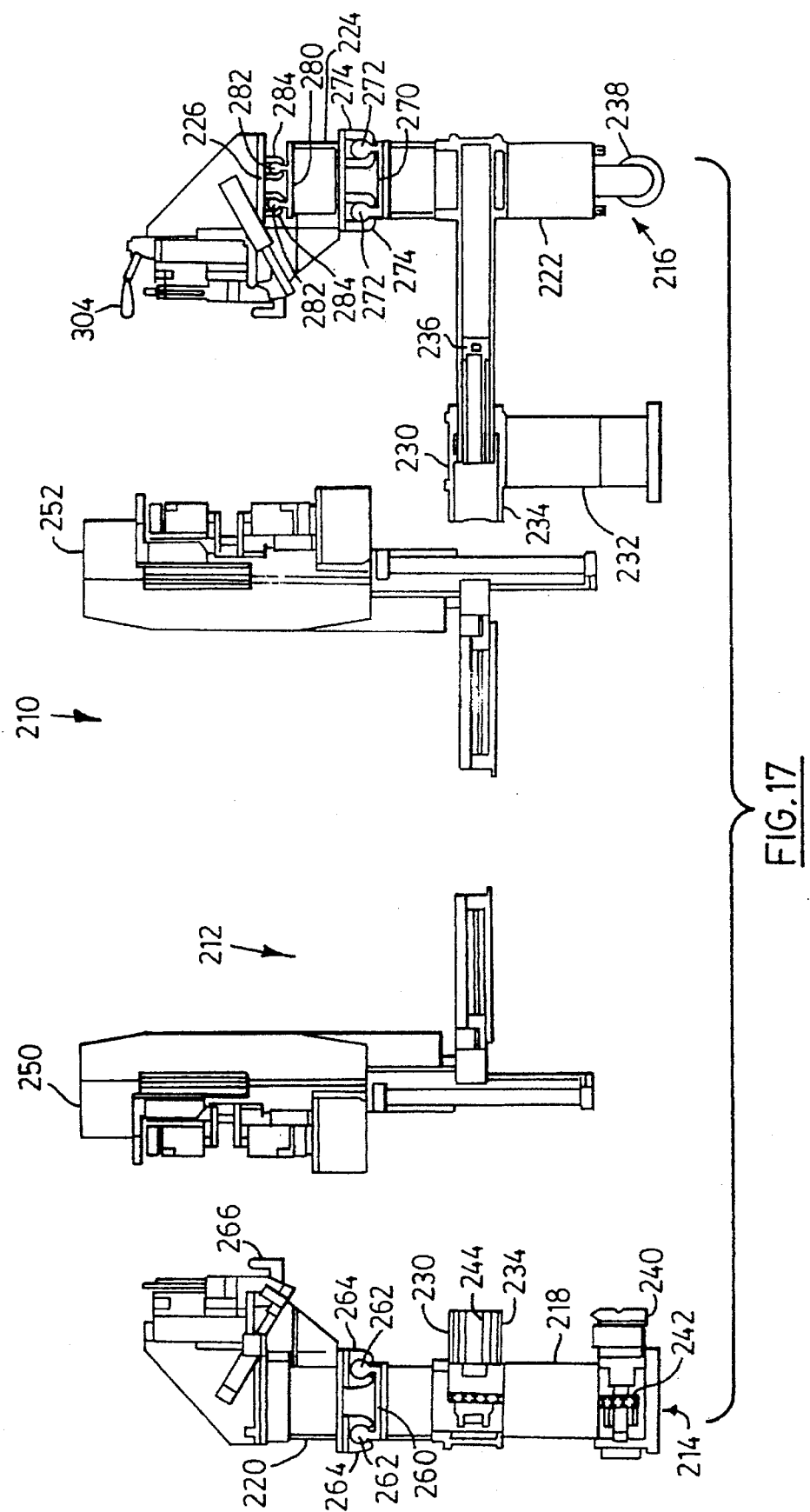
FIG. 17 is a view of an alternate embodiment of a device looking in the downstream direction of material flow along line 17—17 of FIG. 18.

With reference to FIG. 17 the device 210 comprises a number of basic component portions. A support surface 212 is used to support an upper channel 14 and a lower channel 16. The support surface 212 is supported on a first support portion 214 and a second support portion 216. The first support portion 214 comprises a support leg 218 and a carriage 220. The second support portion 216 comprises a support leg 222, a carriage 224 and a carriage 226.

The device 210 comprises first and second assembly stations 250 and 252 which correspond roughly to the assembly stations 50 and 52 in the previous device.

The device 210 also comprises horizontal support structure 230 which is supported on intermediate support legs 232. The assembly stations 250 and 252 are supported on the support structure 230 and may be moved horizontally along the structure 230.

Each of the assembly stations 250 and 252 is mounted on structure to be discussed more fully hereinafter permitting the "button" making heads to move vertically and to permit the heads to rotate about the axis of vertical movement.

The horizontal support structure 230 includes telescoping beams comprising internal and external members. The external member 234 is fixed to the support portion 214 while the internal member 236 is fixed to the second support portion 216. The second support portion 216 is mounted on a roller 238 for contacting the floor or other work surface.

The support portion 214 includes a motor 240 which may be either electric or hydraulic. The motor 240 drives a chain 242 which is connected to a screw 244. The screw 244 acts in association between the outer portion 234 and the inner portion 236 of the support structure 230 to cause relative movement between the outer portion 234 and the inner portion 236. Thus, operation of the motor 240 will change the lateral spacing between the support portions 214 and 216, thus providing for walls of differing overall height. The location of the intermediate support legs 232 will define the minimum height wall that can conveniently be built on the device. This support legs 232 however, is positionable wherever desired and as most walls are of approximately eight feet in overall height or greater, the support legs 232 may be in the order of approximately six feet from the support portion 214. This would permit fabrication of walls of six feet and higher to a height of 12 feet. If flexibility to build walls greater than 12 feet high is required then either the initial positioning of the support legs 232 may be at a greater distance from support portion 214 or a double acting telescoping member may be used to provide greater flexibility.

The support portion 214 includes a track 260 which may conveniently be comprised of a pair of bars or tubes 262. The carriage 220 may comprise a pair of saddles 264 adapted to snugly fit the rails 262 for sliding movement along the rails. The carriage 220 may thus slide longitudinally back and forth along the first support portion 214. The carriage 220 comprises gripping means 266 for grasping the channel 14.

The support portion 216 comprises a track 270 comprised of a pair of rails 272. The carriage 224 comprises a pair of saddles 274 to closely receive the rails 272. Saddles 274 and rails 272 are similar to saddles 264 and rails 262. Thus, the carriage 224 is slidable longitudinally along the support portion 216. The carriage 224 advantageously comprises a second track 280. The track 280 may be comprised of a pair of rails 282. The carriage 226 comprises a pair of saddles 284 for sliding engagement with the rails 282. The saddles 284 engage the rails 282 in a manner similar to the engagement between saddles 264 and rails 262. This provides that the carriage 226 may move along the carriage 224 along the track 280. Thus, the carriage 226 may move along the support portion 216 by moving with respect to support portion 216 either along track 270 or track 280 or both.

Figure 18:
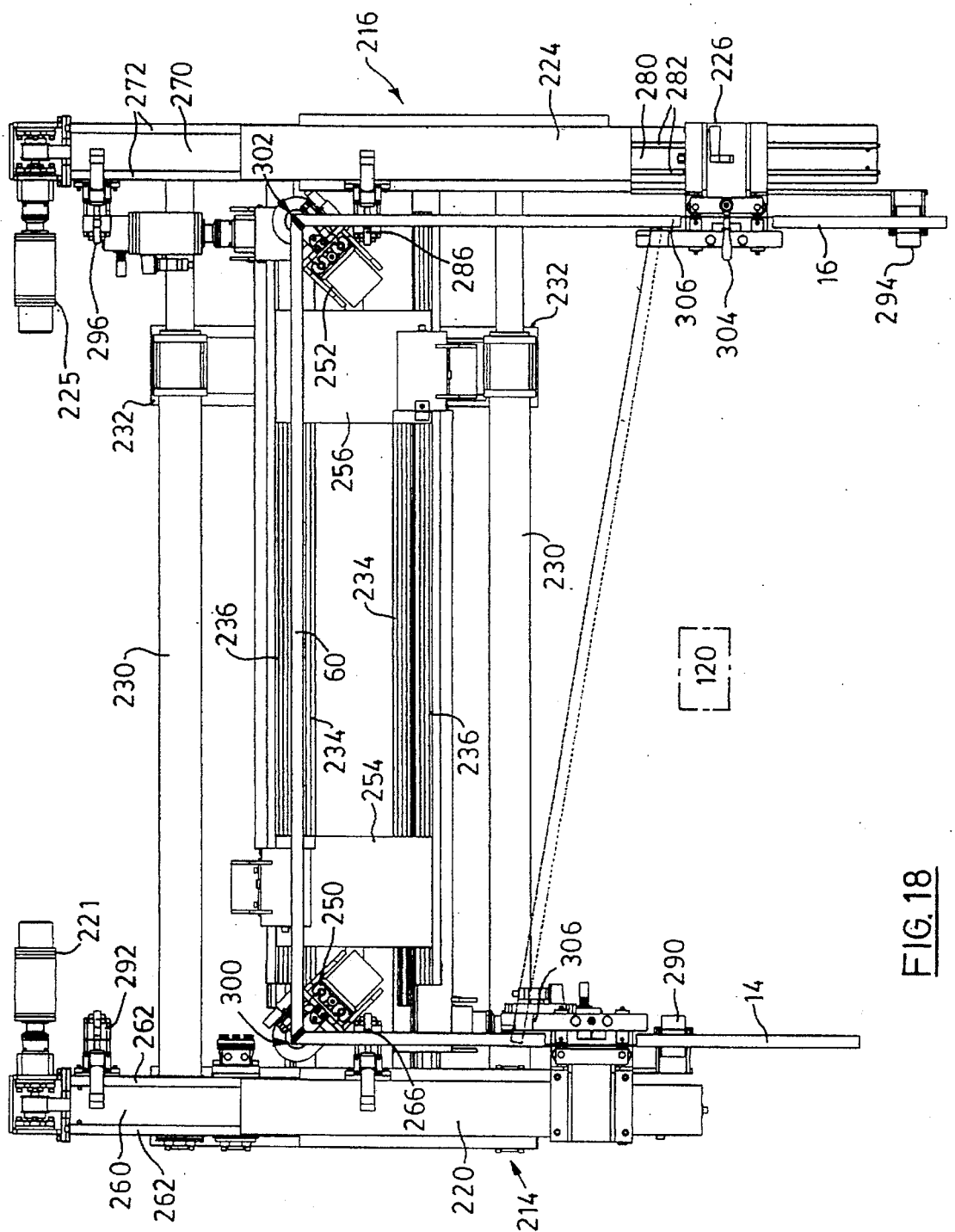
FIG. 18 is a plan view of the alternate embodiment shown in FIG. 17.
Figure 19:
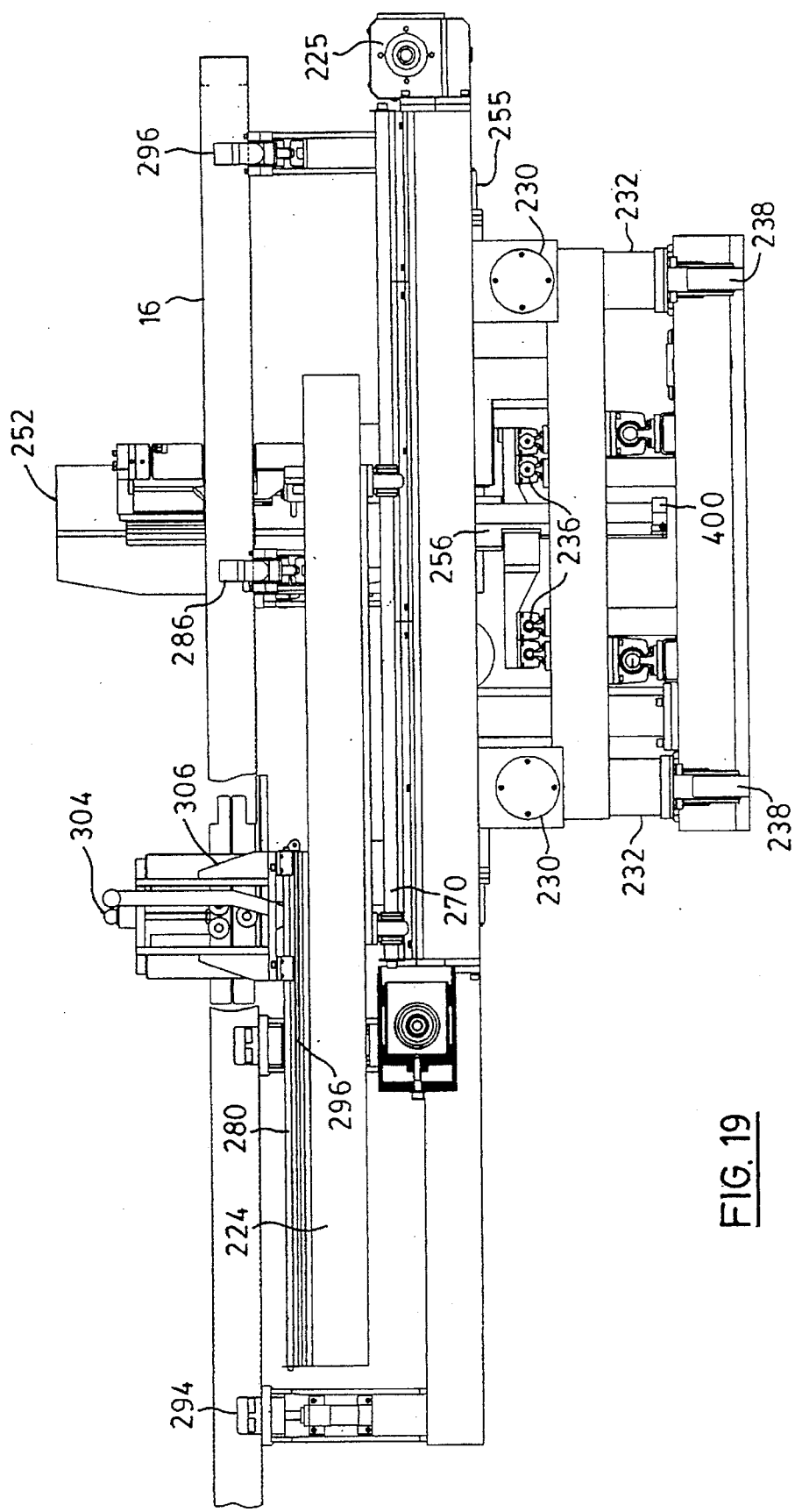
FIG. 19 is a right side view of the embodiment shown in FIG. 18.

As FIG. 17 is a sectional view along the line A—A of FIG. 18, the connection between various channel gripping means and the various structures requires further explanation. All gripping means are arranged at a height to grasp the upper or lower channel members 14 and 16 respectively. Gripping members however are located with respect to different structural items. From reference to FIG. 18 it will be noted that gripping member 266 discussed with respect to FIG. 17 is located in plan view approximately near the location of assembly station 250. The support portion 214 comprises additional similar gripping means 290 which is structurally connected to the support leg 218 and which is located significantly upstream of the assembly station 250 and upstream of the track 260. The support portion 214 also comprises an additional gripping means 292 which is located downstream of the assembly station 250. Similarly, the support portion 216 comprises the gripping means 286 which is located on carriage 224 and the upstream gripping means 294 which is structurally attached to support leg 222 and downstream gripping means 296 also structurally attached to support leg 222.

Also with review to FIG. 18 it will be noted that the stud 60 is assembled to the upper and lower channels 14 and 16 on the opposite side of the assembly stations 250 and 252 as compared with the procedure used in association with the embodiment shown in FIGS. 1 to 16. The operator 120 will stand in essentially the same position in respect of either embodiment. To commence operation with the embodiment shown in FIGS. 17 through 21, the operator first loads in the upper track 14 and the lower track 16. These are slid along the support surface 212 and are moved against positioning stops the location of which is shown by the arrows 300 and 302. The stops are similar to disappearing dogs 110 and 112 discussed in association with the first embodiment. At the commencement of the procedure carriages 220 and 224 are at their most upstream position relatively to their respective supporting legs 218 and 222 and carriage 226 is at its most upstream position relative to carriage 224. The upper and lower channels 14 and 16 are respectively grasped by gripping means 290 and 294 respectively. A stud 60 is then positioned as shown in dotted lines in FIG. 18. One end of the stud as shown on the left hand side of FIG. 18 is positioned within the upper channel 14 with the stud on an angle to permit the stud to pass inside the flanges of the lower channel 16. The right hand end of the stud as shown in FIG. 18 is downstream of the carriage 226. From reference to FIGS. 17 and 18, it will be noted that the carriage 226 includes a handle 304 which may be grasped by the operator 120. To move the stud 60 to the desired position, that is at 90° to both upper channel 14 and lower channel 16, the operator pushes on the handle 304 causing the carriage 226 to move along track 280. By moving the carriage 226 along the track 280 the operator is able to properly seat the stud 60 between the upper and lower channels and to in effect wedge or seat the stud between the upper and lower channels. The channels are held by the gripping means 290 and 294 respectively and do not move. In order to position the stud the carriages 220 and 226 are equipped with guides 306 to contact the stud 60. The guides 306 are essentially similar to each other and are configured to contact and hold the stud 60. In this embodiment the guides 306 serve a somewhat similar function as the receptor blocks 130 and 132 discussed with the first embodiment.

When the operator pushes on the handle 304, the floating guide 306 mounted on carriage 226 will move forward along track 280 to the full extent of its downstream travel. At that point the two guides 306 are opposite each other with the stud 60 square to the upper and lower channels 14 and 16. At this point the carriage 226 is locked in place with respect to carriage 224 by means of a latch. The two guides now will move with carriages 220 and 224.

The next step in the sequence follows on the operator identifying to the controller that the stud is square to the upper and lower channels 14, 16. This may be done either by the operator contacting a button on the controller or computer or by a sensing means locating the presence of the stud 60 in the square location. Upon receipt of the signal, the carriages 220 and 224 are driven in the downstream direction by servo motors connected to each carriage while the upper and lower channels remain held on the fixed structure 218 and 222. This action pushes the stud along the upper and lower channels 14, 16 until the stud is located precisely opposite the assembly stations 250 and 252. By reason of the location of the stops 300 and 302, the stud is now positioned at precisely the end of each of the upper and lower channels respectively. The carriages 220 and 224 are then returned to the upstream starting position.

During the foregoing steps the assembly stations 250 and 252 have been at their initial starting position which is below the support surface 212 and between the upper and lower channels 14 and 16. The first step in the operation of the assembly stations 250, 252 is that they are moved vertically upwardly to the correct height. The assembly stations 250, 252 then pivot about the axis of vertical movement as required depending upon the orientation of the stud 60 which is discussed more fully below. Each assembly station is then in position to execute the fastening procedure which may be the installation of screws, button joints or the like all as more thoroughly discussed below.

While the assembly stations 250 and 252 are performing their steps of movement and execution of the connection, the operator 120 may be positioning a second stud in a manner similar to positioning the first stud. Again the operator 120 will position the stud with the left end as shown in FIG. 18 downstream of the carriage 220 at an angle. The operator will use the handle 304 and slide the carriage 226 with its guide 300 forward to again wedge the next stud between the upper and lower channels with the stud essentially square to the upper and lower channels. At this stage the gripping means 290 and 294 release the upper and lower channels and simultaneously the gripping means 266 and 286 are cycled so that the upper and lower channels are then gripped respectively and are fixed to the carriage 220 and the carriage 224. The carriages 220 and 224 are then moved down stream by the servo motors 221 and 225 while gripping the upper and lower channels 14, 16 respectively to move the building structure in the downstream direction.

As the carriages 220 and 224 move downstream, they initially carry the upper and lower channels with them, and the next stud 60 is also carried in the downstream direction by the channels 14, 16 and by the guides 306. When the upper and lower channels 14, 16 have moved so that the next stud location is adjacent the assembly stations 250, 252 the grippers 266, 286 on the carriages 220, 226 release the channels and the grippers on the fixed supporting legs 218 and 222 grip the channels. Further movement downstream of the carriages 220 and 224 pushes the stud 60 along the channels 14, 16 until the next stud is in the correct location. The guides 306 push the stud along the upper and lower channels 14, 16. All three carriages 220 and 226 are then returned to their most upstream location for insertion of a next stud. Carriage 226 is pulled upstream to the starting position by handles 304. The sequence can then be continued indefinitely installing studs as required by the program fed to the computer. The controller thus controls the functioning of the servo motors 221, 225 driving carriages 220 and 224 as well as all of the grippers as needed.

One of the significant advantages of this second embodiment is the moving of the assembly stations. With moving heads as illustrated in this embodiment it is possible to make a button joint regardless of the orientation of the stud. In order to form a button joint it is necessary to have an anvil for support which will be inside the U or C-shaped configuration of the stud and a punch which would be exterior to the flange of the stud.

In order to have the anvil approach the stud and have the stud reversible for door frames, etc. as discussed above the anvil must be able to approach the stud from either the upstream or downstream direction. Also, in order to have the anvil approach the stud in this direction, the hydraulic ram must approach the channel-stud connection point from between the upper and lower channels. Obviously this means that arrangements must be made for the head to disappear to allow movement of the building structure along the support surface.

Figure 20:
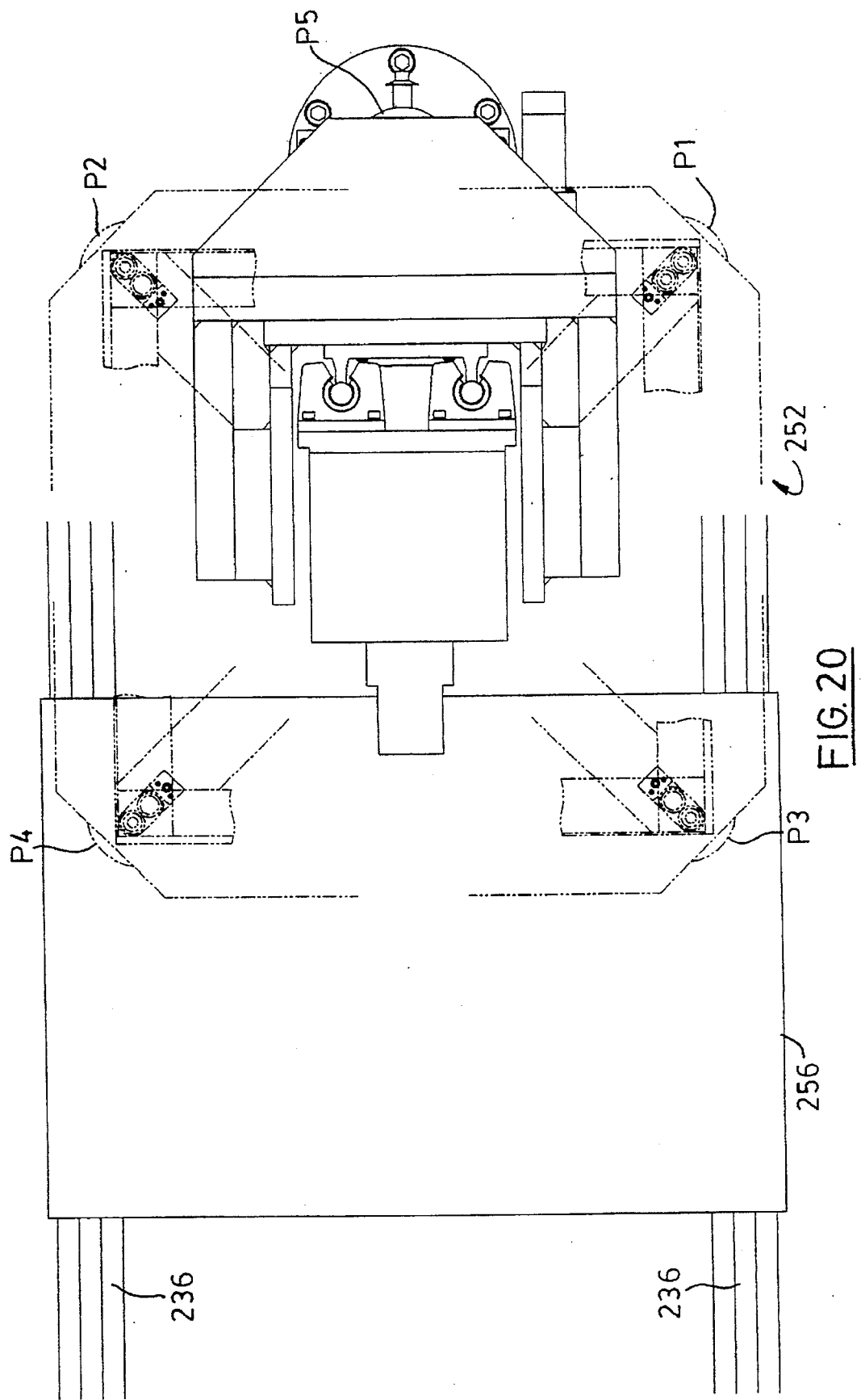
FIG. 20 is a plan view showing alternate positions of an assembly device advantageously used in the embodiment of FIG. 18.

In order to achieve all of the desired directions of movement, the assembly stations 250 and 252 are made to be movable, preferably in three directions. The assembly stations are movable vertically, that is in the Z direction, are movable across the width of the device, that is in the Y direction, and pivot about the axis of vertical movement. As shown in FIG. 20 which is a plan view of assembly means 252, the assembly head moves vertically via a hydraulic cylinder while in position P5. The head rotates to position P1 if the stud face is outward and to position P2 if the stud face is inward. Positions P3 and P4 are used if attaching cripples or headers which may be internal to the upper and lower channels 14 and 16. The clinching head assembly penetrates the stud and channel at an approximate 45° angle, although any angle is possible. A combination of X travel by the carriages 220 and 224 and pivoting action by the heads may be used if necessary or advantageous in positioning the assembly head within the intersection between the stud and upper and lower channel or in between a stud and header.

From reference to FIGS. 18 and 20 it will be appreciated how Y direction of the assembly stations 250 and 252 is accomplished. The support structure 230 comprises 2 sets of horizontal tracks 234 and 236. Each assembly station comprises a carriage 254, 256 respectively which travel along the respective tracks. Servo motors (one of which is shown as 255) drive the carriage back and forth individually along the respective track to position the assembly station where desired. The two tracks 234 and 236 are fixed to the support structures 214 and 216 respectively, so that as the support structure 230 is expanded or contracted, the tracks and carriages are moved simultaneously. The servo motors controlling the position of the carriages are also controlled by the controller and computer 100.

Figure 21:
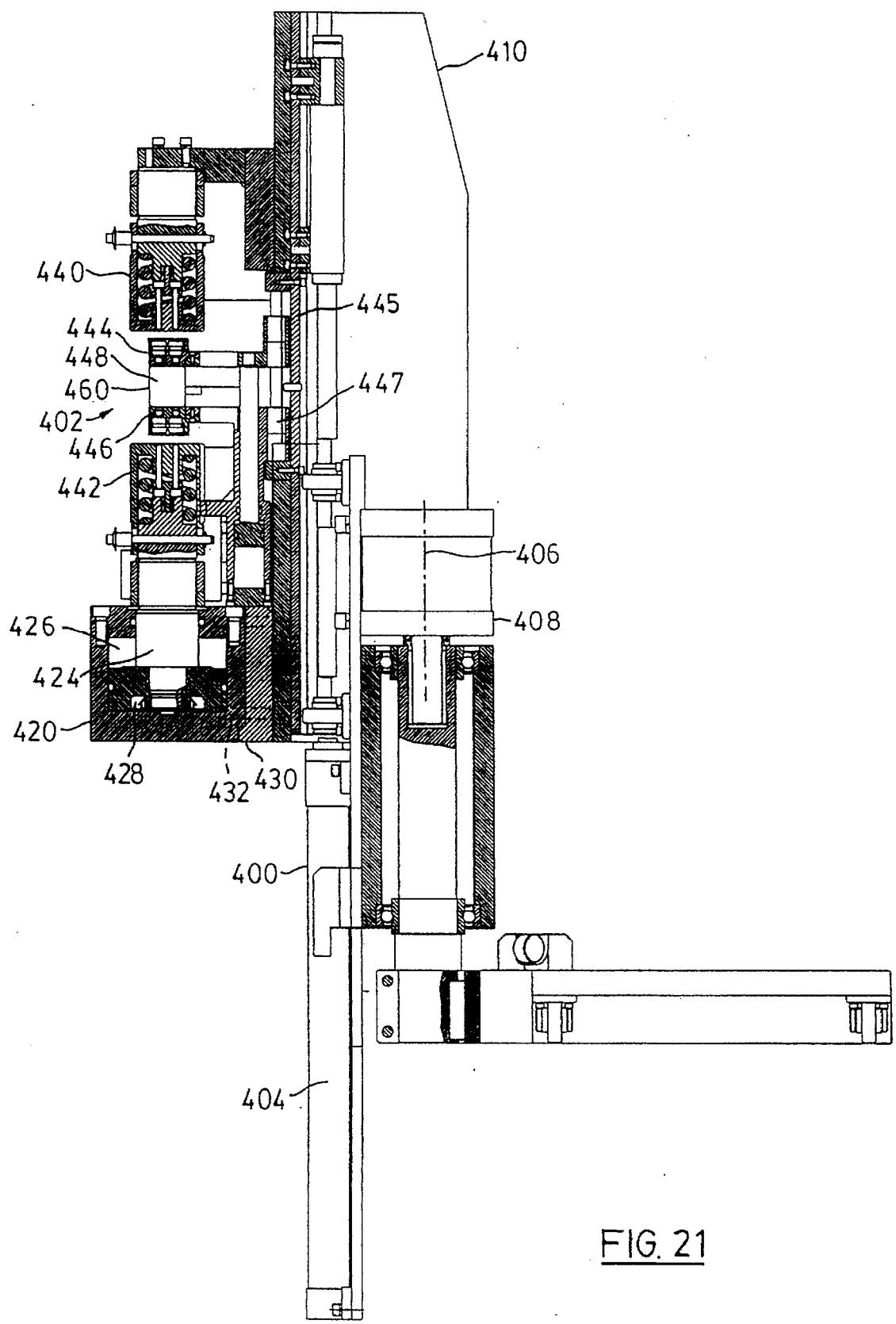
FIG. 21 is a vertical sectional view of the assembly device of FIG. 20.

FIG. 21 illustrates the assembly station 252 in significantly greater detail. Hydraulic cylinder 400 is used to vertically elevate the clinching head illustrated generally at 402. The clinching head 402 is elevated along the general axis 404. The clinching head 402 is rotatable about the axis 406 by means of a hydraulic motor 408. In order to support the head 402 the bracket 410 provides necessary support for the head 402.

Head 402 is designed to simultaneously create four button type joints between the stud 60 and upper or lower channel 14, 16. There are two button members on each flange to flange overlap of material thus providing four strong connections. Typically, because of the difficulty and time required, formerly studs and channels were connected by perhaps only one screw, although ideally one screw should be used on each flange to flange interface for a total of two screws. The mechanism shown in FIG. 21 thus provides a joint which is considerably stronger having four connecting means as well as the significant strength of the button joint as compared to a screw which holds on only a portion of thread.

The head 402 is substantially a C-shaped member. If a C-shaped member as traditionally used were provided to respond to the forces involved in making four button joints simultaneously, the stresses in the C-shaped member would be extreme. In order to build a device able to resist the stresses that would be necessary if thicker gauge materials are involved, it would be necessary to provide significant internal support. This in turn would mean that significant support would be required within the channel and there would be insufficient room to use a joint of this type unless the stud were larger than four inches. With the particular device as shown in FIG. 21 four button joints may be made in studs of two inches even though heavy walled material is used for stud and channel.

In order to meet the forces required by the desirability of installing four buttons at once, the clinching head 402 has unique advantageous features. A hydraulic cylinder 420 comprises a piston 424 and two fluid chambers 426 and 428. The cylinder 420 is fastened to a frame 430 by bolts 432. The clinching assembly comprises upper and lower punches 440 and 442 and internal dies held in die holders 444 and 446. The die holders 444 and 446 are moved together and apart by hydraulic piston 448 which is a floating double acting piston. Finally, a spacer block 460 controlled by a separate piston can be inserted between the die holders 444 and 446.

The space block 460 and its piston are a significant part of this system. If the stud is not weight bearing, it may be U-shaped. With a U-shape it would be possible to move a block and upper and lower dies into the stud. However, if the stud is load bearing it will probably be C-shaped. With a C-shaped stud, the block-die combination must expand after it is inside the stud.

Figure 22:
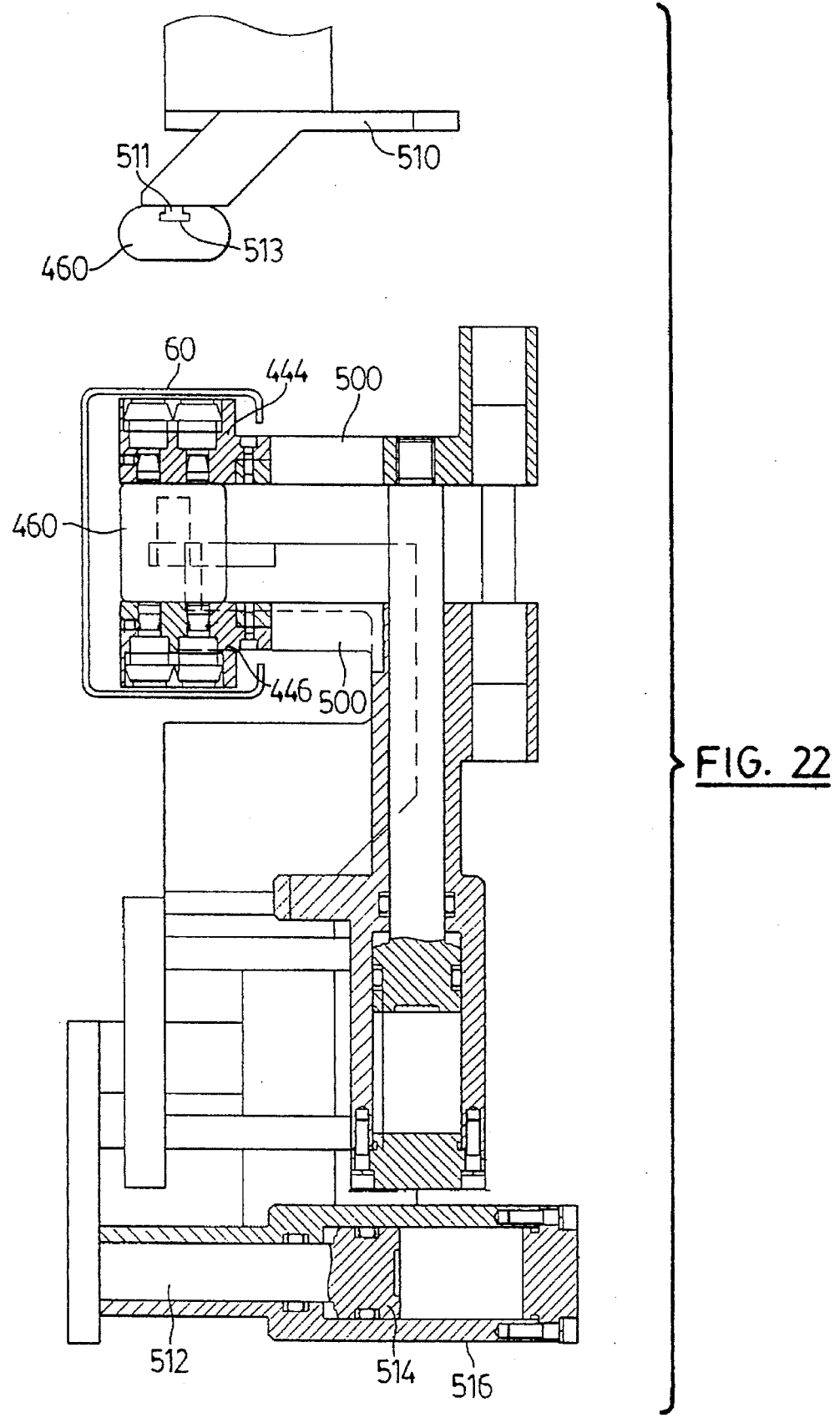
FIG. 22 is a detail view of a spacer and die holder mechanism used in the device of FIG. 21.

FIG. 22 shows the spacer block 460 and the upper and lower die holders 444 and 446 in more detail. The upper and lower die holders 444, 446 each have a hole 500 which accommodates the spacer block 460. The spacer block 460 is supported by a support structure 510. The connection between the spacer block 460 and its support structure 510 is a floating connection. This may be readily accomplished used a T-shaped head 511 operating within a T-shaped slot 513 in the block 460. The support structure 510 is mounted to a piston rod 512 attached to a piston 514. Piston 514 operates within a cylinder 516. Operation of the cylinder and piston 516/514 moves the spacer block horizontally. When the spacer block is in alignment with the holes 500, the upper and lower die holders 444 and 446 may move together by operation of cylinder 448. When together the die holders 444, 446 may be moved in and out of the C-shaped stud 60.

In order to perform a clinching function, hydraulic fluid is supplied to chamber 428 of cylinder 420. This causes upward movement of piston 424. Upward movement of the piston 424 causes movement of the lower punch 442 where the punches will contact the flange of the channel and stud. The die holder 446 acts as an anvil to the pressure and the stress on the die is then passed to spacer block 460. The stress on the spacer block 460 is passed to the die holder 444 which in turn passes the stress on to the upper punch 440. The upper punch 440 is affixed to the support 410 to provide the structural support.

When the button forming operation is complete and all four buttons have been formed, hydraulic fluid is then supplied to chamber 426. This in turn drives the piston 424 downwardly releasing the clinching pressures and separating all of the components. A spring, not shown in FIG. 21, is attached to the body of the upper punch 440 to withdraw the body of the punch vertically upwardly to complete withdrawal of the punches from the dies.

Advantageously the die holders 444, 446 are also able to float with respect to frame 410. To accomplish this, upper die holder 444 and its piston rod of cylinder 448 may move on a linear bearing 445. The lower die holder 446 and the cylinder float on linear bearing 447. The "floating" action of die holders 444, 446 and spacer block 460 eliminates bending forces during the button making operation.

This system is particularly versatile. When a different size stud is used then only two changes are required. Firstly the upper punch 440 is mounted higher on the support 410 to provide the adequate spacing to accommodate the wider stud. The second item that is changed is the upper die holder 444. While typically, punches have been used with larger studs, such as those of six inches width and more, it has not been possible to use studs of relatively smaller size. By means of the system described herein studs of three and a half inches in thickness can be used. With the adjustments referred to above the machine is capable of working with studs up to eight inches thick.

While the invention has been described in particular detail with respect to making the connection between the stud and the upper or lower channel, it will be apparent that the same clenching mechanism may be used to make a button joint at the inner end of cripple studs or to attach headers to cripples as desired. In order to facilitate a joint between a stud and a header or between a cripple stud and a header, it is necessary only to move the assembly stations 250 and 252 horizontally inwardly, that is in the Y direction, to the desired area. The clinching head 402 may be then rotated to either of positions P3 or P4 as shown in FIG. 20, depending upon the direction of opening between the stud and header being considered. Thereafter, a four button clinch of the type described immediately above may be performed.

One of the significant advantages that is achieved by means of a four button clinch at each connection is that the finished building structure is considerably braced against racking. If a single screw is used between a stud and a channel or even if there are two screws installed on each side, it is possible for the stud to pivot about the screw(s), particularly if two screws are used and are co-axially aligned. Although racking could be prevented by putting two screws in each joint, this only increases the time, manpower and labour on the job. With the clinching device as described herein, with four button joints, a very strong non-pivoting connection is formed between each stud and the channel. With this joint there is a significant reduction in the amount of racking that is possible and the structure which emerges from the machine is substantially square on fabrication.

The device according to this embodiment need not be large. Conveniently the entire device may be approximately eight feet wide by approximately five feet long. As a wall of indefinite length is produced it is necessary of course to provide a support surface that extends beyond the machine for the desired length. This can be of indefinite length and it is necessary only to provide a plurality of freestanding rollers such as those discussed in association with FIG. 1 to support the partially formed building structure prior to its completion.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A device to assist in manufacturing a building structure having first and second metallic channel-shaped framing members and a plurality of metallic studs extending between said framing members, said device comprising:

a support table having a support surface for supporting said first and second framing members;

translating means to move said first and second framing members along said support surface;

controller means for controlling said translating means for locating said first and second framing members at predetermined locations on said support surface;

locating means to locate a stud between said framing members;

first and second assembly means for permanently fastening said stud to said first and second framing members in a permanent configuration;

said control means adapted to receive information determining the location of a plurality of studs in said building structure.

2. The device of claim 1 wherein said first and second assembly means include elevating means for moving said first and second assembly means between first and second positions, said first and second assembly means when in said first position being located at a height where said first and second assembly means installs fasteners joining said stud to one said framing member ad when in said second position, said first and second assembly means does not impede movement of said building structure along said support surface.

3. The device of claim 2 wherein each said assembly means is pivotable about an axis perpendicular to said support surface.

4. The device of claim 3 wherein each said assembly means is mounted for movement parallel to said support surface.

5. The device of claim 1, said device comprises a first support portion for supporting said first framing member and a second support portion for supporting said second framing member;

said first support portion comprising a support leg, a track mounted on said support leg, and a carriage mounted on said support leg for movement along said track, said second support portion comprising a support leg, a track mounted on said support leg, and a carriage mounted on said support leg for movement along said track.

6. The device of claim 5 wherein one of said first and second support portions further comprises a second track mounted on said carriage and a second carriage mounted on said carriage for movement along said carriage.

7. The device of claim 5 further comprising a beam extending between said first and second support portions, said beam including adjustment means so that the spacing between said first and second support portions may be varied so that building structures of different spacing between said first and second frame members may be selectively assembled on said device.

8. The device of claim 1 wherein said first and second assembly means comprise means to create a button joint by deforming metal from a flange of a stud or a flange of a framing member.

9. The device of claim 8 wherein said assembly means comprises spacer means insertable between two flanges of a stud to support said stud during making said button joint.

10. The device of claim 9 wherein said assembly means includes a frame, an upper punch assembly, a lower punch assembly, an upper die assembly, a lower die assembly and said spacer means is insertable between said upper and lower die assembly.

11. The device of claim 10 wherein said assembly means further comprises a double acting hydraulic cylinder and piston and said cylinder and said upper punch assembly are fixed to said frame and said piston is fixed to said lower punch assembly.

* * * * *